US008699039B2

(12) United States Patent
Kitazaki

(10) Patent No.: US 8,699,039 B2
(45) Date of Patent: Apr. 15, 2014

(54) DOCUMENT GENERATING APPARATUS, DISPLAY CONTROL APPARATUS, DOCUMENT GENERATING METHOD, DISPLAY CONTROL METHOD AND COMPUTER READABLE MEDIUM

(75) Inventor: Masako Kitazaki, Yokohama (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1174 days.

(21) Appl. No.: 12/014,258

(22) Filed: Jan. 15, 2008

(65) Prior Publication Data

US 2008/0240565 A1 Oct. 2, 2008

(30) Foreign Application Priority Data

Mar. 29, 2007 (JP) .................................. 2007-87246

(51) Int. Cl.
*G06K 15/00* (2006.01)
(52) U.S. Cl.
USPC .......................... 358/1.12; 358/1.15; 358/1.13
(58) Field of Classification Search
USPC ............. 358/1.15, 1.18, 1.9, 1.13, 1.16, 1.12, 358/505, 506, 401; 399/80; 345/173, 174, 345/176
See application file for complete search history.

(56) References Cited

U.S. PATENT DOCUMENTS

| 5,511,148 | A | 4/1996 | Wellner | |
|---|---|---|---|---|
| 7,012,712 | B2 * | 3/2006 | Spurgeon et al. | 358/1.18 |
| 7,319,538 | B1 * | 1/2008 | Fang et al. | 358/1.15 |
| 7,463,270 | B2 * | 12/2008 | Vale et al. | 345/619 |
| 2004/0257601 | A1 * | 12/2004 | Tomiyasu et al. | 358/1.9 |
| 2006/0262336 | A1 * | 11/2006 | Venkatachalam et al. | 358/1.13 |
| 2007/0139711 | A1 * | 6/2007 | Miyata | 358/1.18 |

FOREIGN PATENT DOCUMENTS

JP A-07-168949 7/1995

OTHER PUBLICATIONS

Sep. 27, 2011 Office Action issued in Japanese Patent Application No. 2007-087246 (with translation).
"Get the Latest Version of Selected Software!," Windows 100%, Japan, Shinyusha Co., Ltd., Apr. 1, 2006, vol. 9, 4th issue, p. 94 (with concise explanation).
Vector Software News, New Software Review "Endo-san no tameno Haado Kopii-Kun," Vector Inc., Jul. 6, 2005, URL: http://www.vector.co.jp/magazine/softnews/050706/n0507064.html (with concise explanation).
Translation of Dec. 13, 2011 Office Action issued in Japanese Patent Application No. 2007-087246.

* cited by examiner

*Primary Examiner* — Vu B Hang
(74) *Attorney, Agent, or Firm* — Oliff PLC

(57) ABSTRACT

The document generating apparatus is provided with: an acquiring unit that acquires information on a first operation on a display screen and information on a second operation on the display screen, the first operation being for designating a part area of an image as an area to be included in an electronic document, and the second operation being for setting a size of a medium on which the electronic document is printed; an adjusting unit that adjusts the part area of the image designated in the first operation into the medium of which size is set in the second operation; and a generating unit that generates the electronic document based on the image adjusted by the adjusting unit.

12 Claims, 21 Drawing Sheets

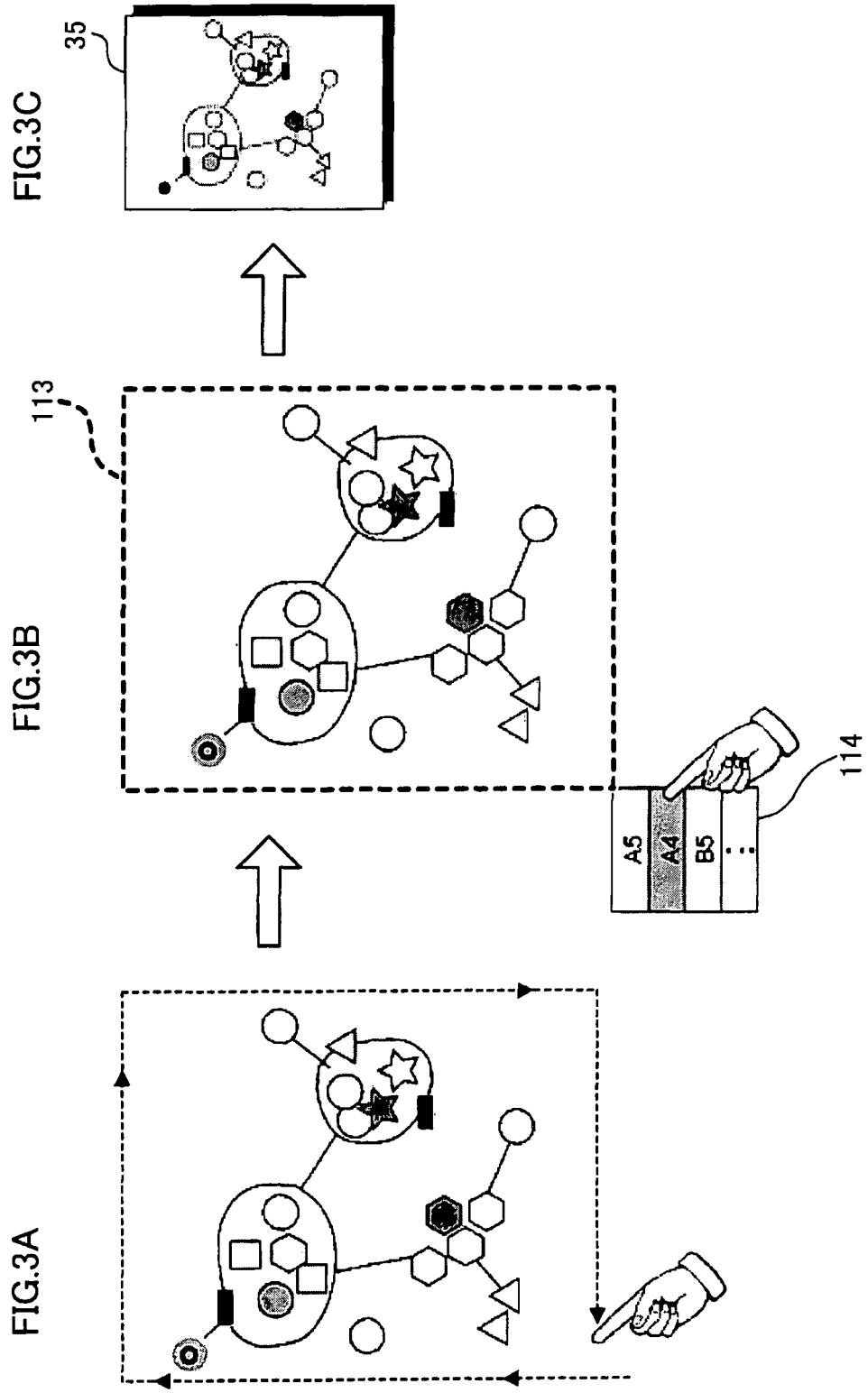

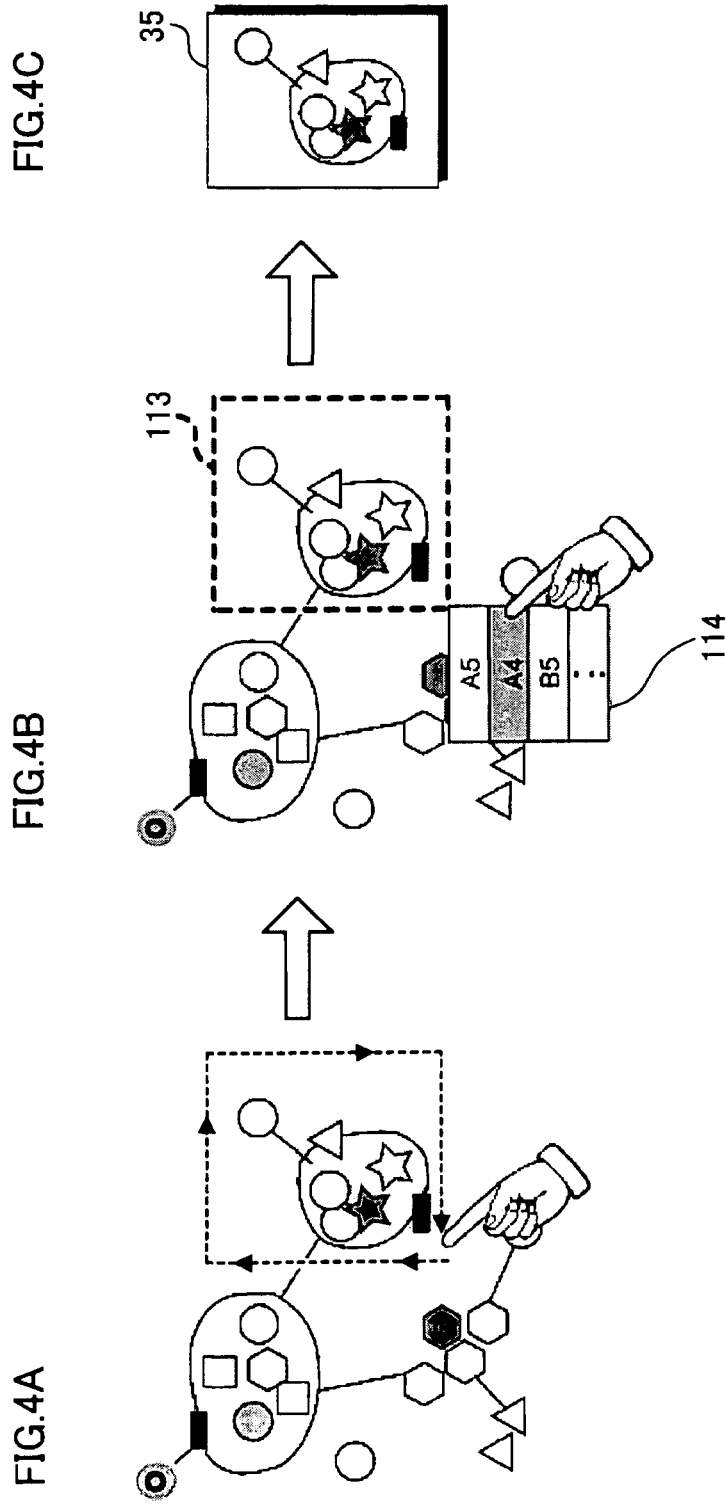

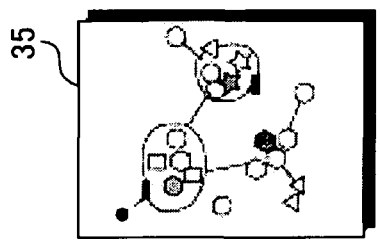
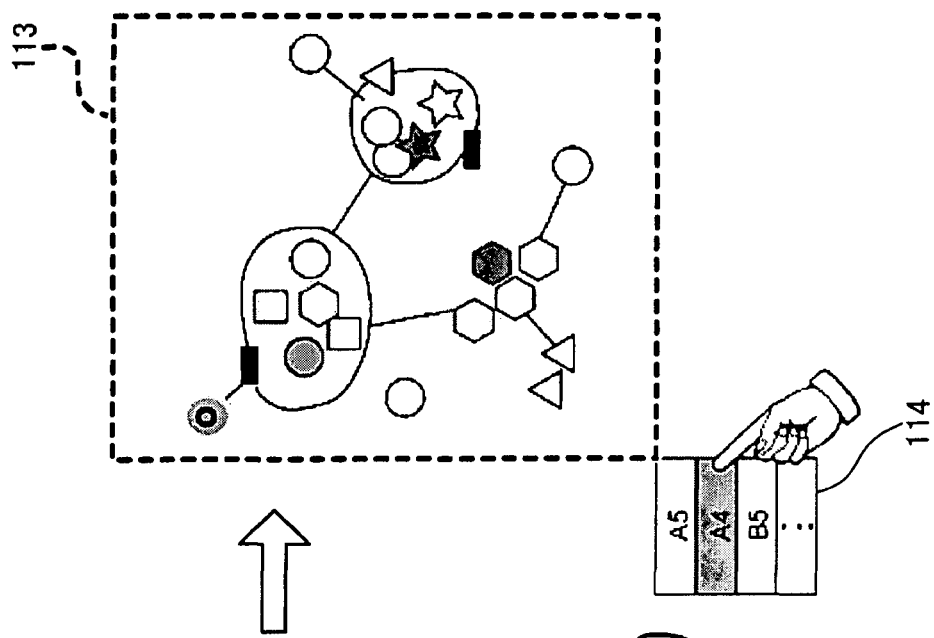
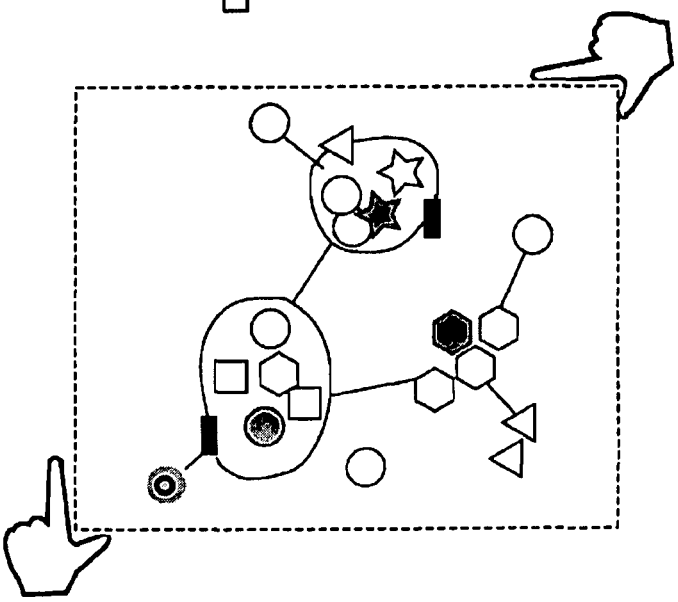

FIG.15A

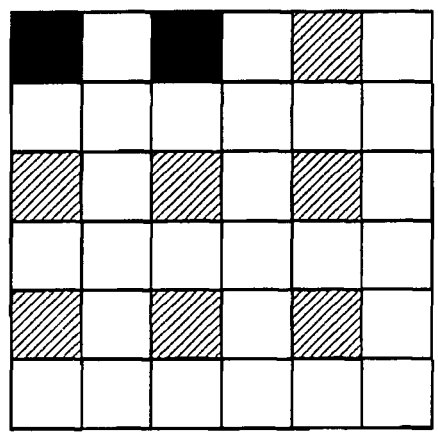

FIG.15B

| SYNCHRO-NOUS CODE 2bit | IDENTIFI-CATION CODE 5bit | IDENTIFI-CATION CODE 5bit | IDENTIFI-CATION CODE 5bit | IDENTIFI-CATION CODE 5bit |
|---|---|---|---|---|
| IDENTIFI-CATION CODE 5bit | IDENTIFI-CATION CODE 5bit | IDENTIFI-CATION CODE 5bit | IDENTIFI-CATION CODE 5bit | IDENTIFI-CATION CODE 5bit |
| IDENTIFI-CATION CODE 5bit | IDENTIFI-CATION CODE 5bit | IDENTIFI-CATION CODE 5bit | IDENTIFI-CATION CODE 5bit | IDENTIFI-CATION CODE 5bit |
| IDENTIFI-CATION CODE 5bit | IDENTIFI-CATION CODE 5bit | IDENTIFI-CATION CODE 5bit | IDENTIFI-CATION CODE 5bit | IDENTIFI-CATION CODE 5bit |
| IDENTIFI-CATION CODE 5bit | IDENTIFI-CATION CODE 5bit | IDENTIFI-CATION CODE 5bit | IDENTIFI-CATION CODE 5bit | IDENTIFI-CATION CODE 5bit |

FIG.16A

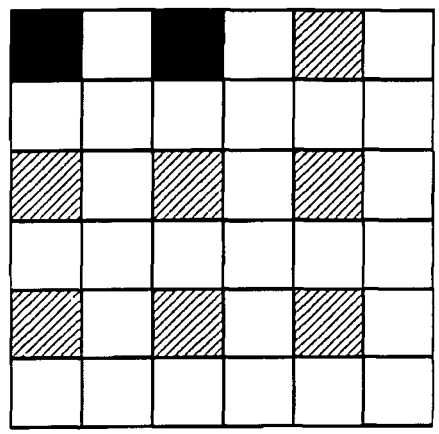

FIG.16B

| SYNCHRO-NOUS CODE 2bit | X POSITION CODE 5bit | X POSITION CODE 5bit | X POSITION CODE 5bit | X POSITION CODE 5bit |
|---|---|---|---|---|
| Y POSITION CODE 5bit | IDENTIFI-CATION CODE 5bit | IDENTIFI-CATION CODE 5bit | IDENTIFI-CATION CODE 5bit | IDENTIFI-CATION CODE 5bit |
| Y POSITION CODE 5bit | IDENTIFI-CATION CODE 5bit | IDENTIFI-CATION CODE 5bit | IDENTIFI-CATION CODE 5bit | IDENTIFI-CATION CODE 5bit |
| Y POSITION CODE 5bit | IDENTIFI-CATION CODE 5bit | IDENTIFI-CATION CODE 5bit | IDENTIFI-CATION CODE 5bit | IDENTIFI-CATION CODE 5bit |
| Y POSITION CODE 5bit | IDENTIFI-CATION CODE 5bit | IDENTIFI-CATION CODE 5bit | IDENTIFI-CATION CODE 5bit | IDENTIFI-CATION CODE 5bit |

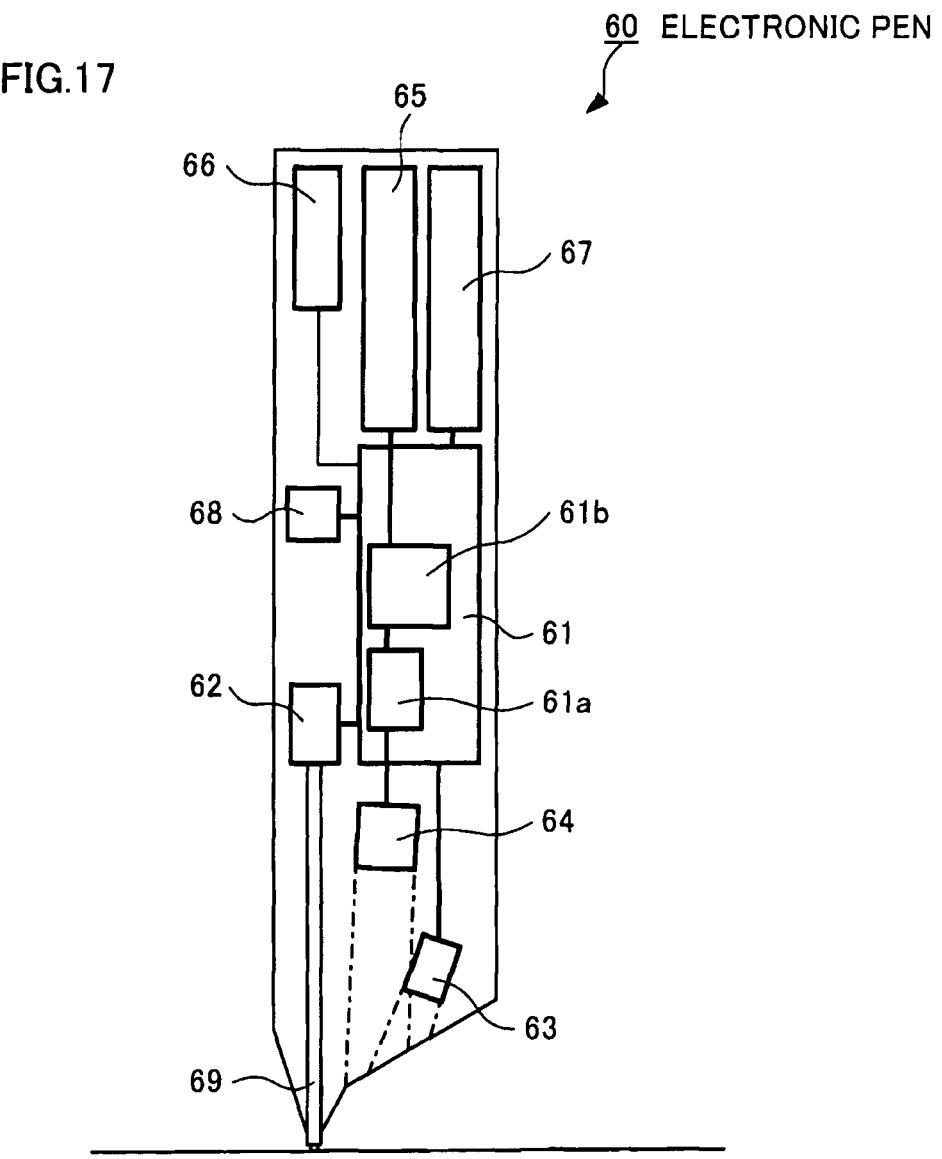

FIG.18

| PAPER ID | OBJECT ID | CENTRAL COORDINATE | SHAPE | SHAPE PARAMETER |
|---|---|---|---|---|
| P001 | Q0011 | X1,Y1 | CIRCLE | R1 |
| P001 | Q0012 | X2,Y2 | SQUARE | La2 |
| P002 | Q0021 | X3,Y3 | CIRCLE | R3 |
| P002 | Q0022 | X4,Y4 | EQUILATERAL TRIANGLE | Lb4 |
| P002 | Q0023 | X5,Y5 | SQUARE | La5 |
| P002 | Q0024 | X6,Y6 | CIRCLE | R6 |
| P002 | Q0025 | X7,Y7 | SQUARE | La7 |
| ⋮ | ⋮ | ⋮ | ⋮ | ⋮ |

DOCUMENT GENERATING APPARATUS, DISPLAY CONTROL APPARATUS, DOCUMENT GENERATING METHOD, DISPLAY CONTROL METHOD AND COMPUTER READABLE MEDIUM

CROSS REFERENCE TO RELATED APPLICATION

This application is based on and claims priority under 35 USC §119 from Japanese Patent Application No. 2007-87246 filed Mar. 29, 2007.

BACKGROUND

1. Technical Field

The present invention relates to a document generating apparatus, a display control apparatus, a document generating method, a display control method and a computer readable medium storing a program causing a computer to execute a process for generating a document and controlling display.

2. Related Art

A technique of causing tables and walls to function as a working environment to spatially expand portable computers is known.

SUMMARY

According to an aspect of the invention, there is provided a document generating apparatus including: an acquiring unit that acquires information on a first operation on a display screen and information on a second operation on the display screen, the first operation being for designating a part area of an image as an area to be included in an electronic document, and the second operation being for setting a size of a medium on which the electronic document is printed; an adjusting unit that adjusts the part area of the image designated in the first operation into the medium of which size is set in the second operation; and a generating unit that generates the electronic document based on the image adjusted by the adjusting unit.

BRIEF DESCRIPTION OF THE DRAWINGS

Exemplary embodiment(s) of the present invention will be described in detail based on the following figures, wherein:

FIGS. 3A, 3B and 3C are diagrams illustrating a first example of the method for electronic documentation;

FIGS. 4A, 4B and 4C are diagrams illustrating a second example of the method for electronic documentation;

FIGS. 5A, 5B and 5C are diagrams illustrating a third example of the method for electronic documentation;

FIGS. 15A and 15B are diagrams illustrating an example of images and the like configuring the code image;

FIGS. 16A and 16B are diagrams illustrating another example of the images and the like configuring the code image;

FIG. 17 is a diagram illustrating an example of a configuration of the electronic pen;

FIG. 18 is a table illustrating an example of specific contents of the content object management table;

DETAILED DESCRIPTION

Hereinafter, the best mode for carrying out the present invention (referred to as "exemplary embodiment" hereinafter) will be described with reference to attached drawings.

In the present exemplary embodiment, as an example of a display apparatus, a horizontal type display apparatus that is surrounded by plural users for discussion or the like is used. Media such as a sheet of paper, an electronic terminal and the like that are brought by users are placed on the horizontal type display apparatus so that images printed on the paper and images displayed on the electronic terminal are shared on a shared screen on the horizontal type display apparatus for discussion or the like. First, the structure of the horizontal type display apparatus will be described.

Figure 1:
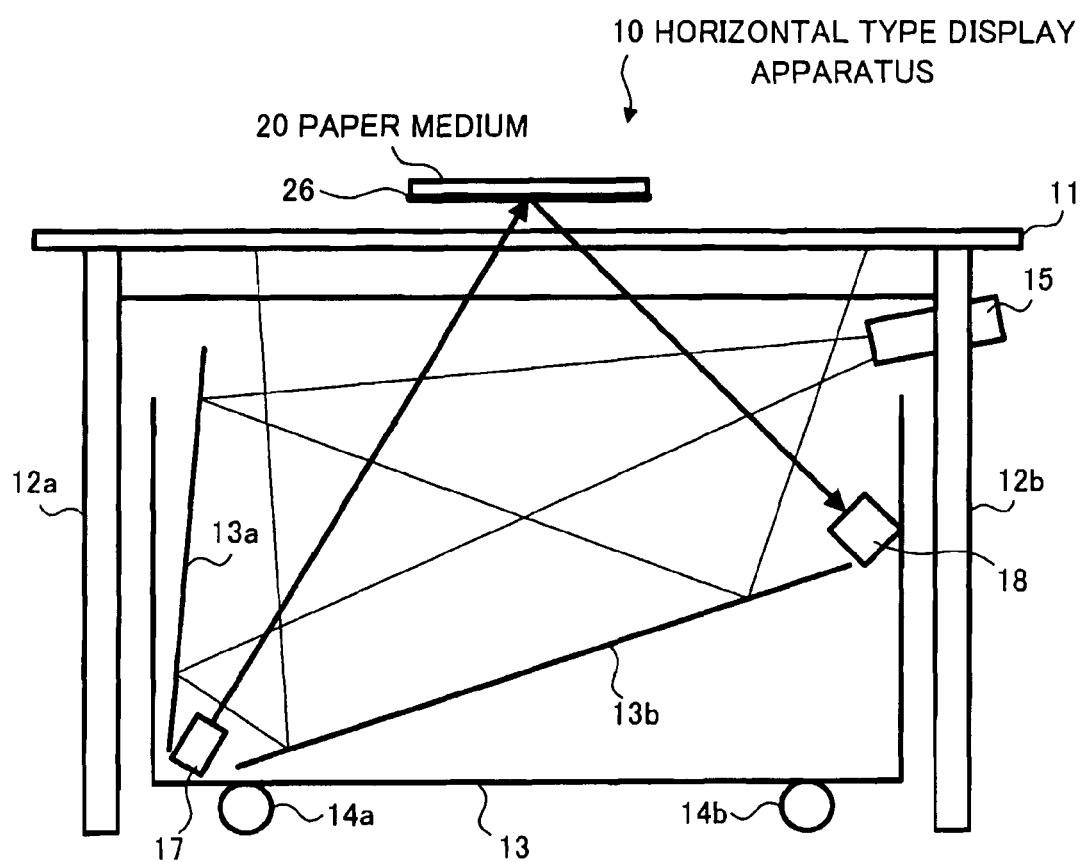
FIG. 1 is a cross sectional view illustrating the case in which a paper medium as an example of a medium is held over the horizontal type display apparatus.

FIG. 1 is a cross sectional view illustrating the case in which a paper medium 20 as an example of a medium is held over a horizontal type display apparatus 10. Although other media are also held over the horizontal type display apparatus 10 in some cases, the case of holding over the paper medium 20 is exemplified here.

As shown in the figure, the horizontal type display apparatus 10 is provided with a tabletop 11 serving as a working table for discussion or the like, and leg portions 12a to 12d that support the tabletop 11. The horizontal type display apparatus 10 is also provided with a projection unit 13 that projects an image from a back surface to the tabletop 11, casters 14a to 14d that support and freely move the projection unit 13, and a projector 15 that projects an image to be projected to the tabletop 11. Further, the horizontal type display apparatus 10 is provided with an infrared light source 17 that irradiates infrared light to the back surface of the paper medium 20 and an infrared camera 18 that receives infrared light reflected on the back surface of the paper medium 20. However, since FIG. 1 is a cross sectional view, the leg portions 12c and 12d, and the casters 14c and 14d are not shown in the figure.

As the tabletop 11, for example, a tabletop with a round shape is used so that users may stand at arbitrary positions around the tabletop and join the discussion or the like. Further, an opaque white semi-transparent filter is adhered to a substrate such as a glass plate to form a transparent type screen so as to function as a display screen (for example, a large screen display) that displays an image projected by the projection unit 13. That is, in the present exemplary embodiment, the tabletop 11 is used as an example of a display of the present invention. Furthermore, the tabletop 11 has a function as a touch panel that detects operation by users to the displayed image. Here, the touch panel may be realized by covering a surface of the tabletop 11 with a transparent screen in which elements for detecting a touch are arranged, or by making infrared light run vertically and horizontally on the surface of the tabletop 11 in order to detect a position where the light is interrupted. In the present exemplary embodiment, a paper medium 20 may be placed on the tabletop 11. Therefore, the function of the touch panel provided on the tabletop 11 is to process a touch on the back surface of the paper medium 20 and a touch as a user operation separately. For example, when a touched portion exceeds a predetermined area, a signal indicating a user operation may not be generated.

The leg portions 12a to 12d are an example in the case of adopting four legs. However, the number of the leg portions is not limited thereto.

The projection unit 13 is formed by a box of a quadrangular prism of which top facing the tabletop 11 is open, and is provided with mirrors 13a and 13b inside thereof. Here, the mirrors 13a and 13b are fixed at angles as shown in FIG. 1, and attached to a side surface of the box of the projection unit 13.

The casters 14a to 14d are attached to a bottom surface of the projection unit 13 so as to move the projection unit 13 in response to movement of the table including the tabletop 11, the leg potions 12a to 12d and the projector 15. In addition, a relative position of the projection unit 13 to the table should not be displaced. Here, although the casters are four in this case, the number of casters is not limited thereto.

The projector 15 is suspended from the tabletop 11, fixed under the tabletop 11 and projects an image in the direction of the mirror 13a. Then, the image is reflected by the mirror 13b and projected to the tabletop 11.

The infrared light source 17 is pulsed light by synchronizing with, for example, shutter timing of the infrared camera 18. Thereby, the infrared light from the infrared light source 17 is periodically irradiated to the area where the paper medium 20 may be held over the tabletop 11. For example, an infrared LED may be used as the infrared light source 17.

The infrared camera 18 takes an image of the back surface of the paper medium 20 where the infrared light is irradiated, by using an image sensor having sensitivity to infrared region. Further, an ID and a position of the paper medium 20 are detected by analyzing the taken image. Here, as an image sensor of the infrared camera 18, for example, a CMOS sensor or a CCD sensor may be used.

In the present exemplary embodiment, images are read by using infrared light so as not to affect images formed by visible light from a projector 15. Further, a holographic light element transmitting light except that having a given angle may be used for the tabletop 11 for secure projection and identification of an ID. Alternatively, a method for switching between projection and an identification of the ID in a short cycle by adhering a film of which transmission and non transmission are changed electrically to the tabletop 11 may be considered.

On the other hand, a code image 26 is formed with color materials, such as toner, which has absorption range in the infrared region. The code image 26 is printed on the back surface of the paper medium 20. Therefore, the ID and the position on the back surface of the paper medium 20 are detected with the infrared light source 17 and the infrared camera 18. The paper medium 20 on which a code image 26 is printed may be referred to as "a sheet of paper with an ID" hereinafter.

Further, in the present exemplary embodiment, a code image may be printed on the surface (the other side of the back surface) of the paper medium 20, not shown in FIG. 1 though. The code image on the surface is read by using, for example, an electronic pen. In this case, a code image is printed by using color materials (for example, toner) that have an absorption range in the infrared region so that the ID and the position of the paper medium 20 are detected with an infrared light source and infrared camera of the electronic pen.

As for the paper medium 20, not only paper in general use, or traditional paper, but also electronic paper which is a display medium used like paper may be used.

Further, although the case in which the paper medium 20 is held over the horizontal type display apparatus 10 is shown in FIG. 1, there may be the case in which, instead of the paper medium 20, an electronic terminal is held over the horizontal type display apparatus 10 as an example of a medium. Here, as the electronic terminal, a mobile terminal apparatus is considered. In addition, although a digital camera is a representative example as the electronic terminal, a laptop PC (Personal Computer), a PDA (Personal Digital Assistant), a mobile phone or the like may also be used. In this case, a code image formed by using color materials, such as toner, having the absorption range in the infrared region is adhered to the bottom of the electronic terminal so that the ID is detected with the infrared light source 17 and the infrared camera 18.

In the present exemplary embodiment, the horizontal type display apparatus 10 is used as an example of a display apparatus having a substantially horizontal screen. With regard to "substantially horizontal" here, it does not indicate to require that the tabletop 11 is completely parallel to a ground surface or a floor surface, but it is just as horizontal as a state in which a medium placed on the tabletop 11 does not slide down. Further, the case to which the horizontal type display apparatus 10 is applied is described hereinafter, but other types of display apparatuses such as a vertical type display apparatus and the like may be applied.

Here, a situation in which operation such as mapping and reconfiguration of content objects included in documents brought by plural attendees are performed on the horizontal type display apparatus 10 in a meeting or the like is considered. In such a situation, it is desirable for the operation such as mapping and reconfiguration with creativity not to set a concept such as an output size frame to an area for the operation.

With regard to this point, a method in which paper size such as A4 or the like (an output size frame) is first set, and in which content objects are arranged in the frame is adopted to the existing word-processing software (electronic document preparation software). However, such the method in which "a paper size is decided firstly and then contents objects are arranged in the frame thereof" is not suitable for the operation of mapping and reconfiguration with creativity mentioned above, and therefore disturbs the operation as it is now.

In the case where results of the mapping (mapping diagram) performed on the display screen are desired to be documented for each part, mapping for each page is required, therefore, an overview as a whole is difficult in a word-processing software currently used. Although there is a method in which a whole mapping diagram is prepared on a page and then the page is divided, it is troublesome to perform a copy and paste for each page and perform arrangement and correction according to the output size frame.

Further, since meeting attendees bring contents of various kinds of media including paper, electronic paper, an electronic terminal and the like, there is variation in content sizes, margins of the medium to content objects, and background colors of the medium. Thereby, when mapping and reconfiguration of the content objects are performed on the display screen to prepare a new document, laborious previous preparation such as transfer to the same medium (such as scanning), conversion to an object from a content (such as clipping each content), equalization of sizes and the transparentization of background color has been required.

Then, in the present exemplary embodiment, an environment in which operation such as mapping and reconfiguration are performed for each content object on the working space to have no concept of the output size frame is proposed.

Further, after completion of the operation such as mapping and reconfiguration of the content object, the document size frame (the output size frame) is designated, and the content scale is enlarged and reduced so as to document the content object. Here, plural portions are selectable and the output size frame is set for respective portions on the working space.

Furthermore, when the content is transferred from various media including paper, electronic paper and an electronic terminal to the above mentioned environment, only content object desired to be transferred may be transferred to the above mentioned environment by an instruction to the media.

Hereinafter, an example of a method according to the present exemplary embodiment is described with reference to FIGS. 2 to 11. First, an example of the working space (an electronic working space) to have no concept of the output size frame is described.

Figure 2:
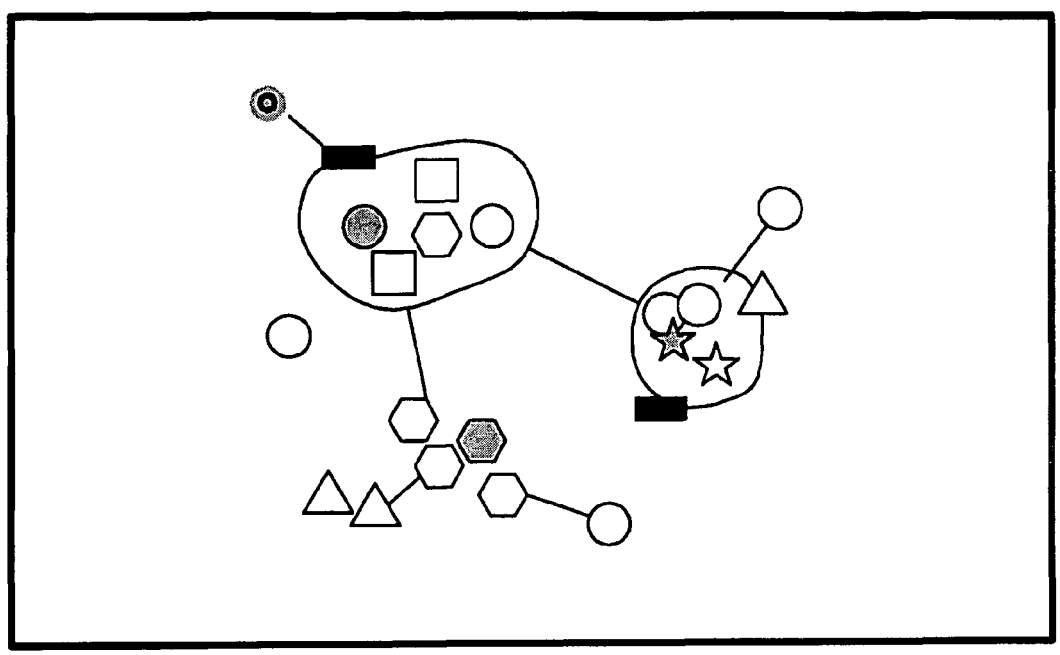
FIG. 2 is a diagram illustrating an example of the working space.

FIG. 2 is a diagram illustrating an example of the working space. In FIG. 2, mapping operation of content objects on the display screen is shown, which is realized by the tabletop 11 of the horizontal type display apparatus 10. Since an area of the mapping operation spreads during discussion, the working space to have no concept of the output size frame is effective.

Here, the content object indicates a unit or a group configuring a document, and the content object itself may be a subject of discussion. Further, when a document is an image printed on the paper medium 20, the content object may be electronic information as a source of a unit or a group configuring the image. That is, in the present exemplary embodiment, the content object is used as an example of an image element included in an image or electronic information as a source of the image element. Furthermore, the background and the margin of the content object are transparent and the concept object does not have concept of size. In FIG. 2, the content objects are represented by circles, squares, regular triangles, regular hexagons, and stars.

Additionally, with regard to a working space, it is an environment in which software for editing object movement, rotation, scale-down and scale-up, and cut-and-paste is projected on the tabletop 11 of the horizontal type display apparatus 10. FIG. 2 shows situations in which plural content objects are enclosed with a line as a group, a content object and any other content object are connected by a line, and a content object and a group are connected by a line by using the software function. The horizontally long black rectangle shown in FIG. 2 is arranged for displaying, for example, a group name of the content object group.

Next, a method for electronic documentation of a portion on the working space to have no concept of the output size frame is described.

FIGS. 3A, 3B and 3C are diagrams illustrating a first example of the method for electronic documentation.

Here, the case of electronic documentation of a whole mapping diagram of the content objects in FIG. 2 is considered. In FIG. 3A, first, the whole mapping diagram as a portion desired to be converted to an electronic document is enclosed with a finger as shown by a dotted arrowed line. Then, as shown in FIG. 3B, a dotted line 113 showing a designated portion (an area) and a menu 114 for selecting paper size are displayed. When a user selects a desired paper size as shown in FIG. 3C, the contents are scaled down or scaled up according to the selected paper size so as to convert to an electronic document. Then, the electronic document 35 is generated.

FIGS. 4A, 4B and 4C are diagrams illustrating a second example of the method for electronic documentation.

Here, the case of the electronic documentation of a part of a mapping diagram of the content objects in FIG. 2 is considered. In FIG. 4A, first, a part of the mapping diagram as a portion desired to be converted to an electronic document is enclosed with a finger as shown by a dotted arrowed line. Then, as shown in FIG. 4B, a dotted line 113 showing a designated portion (an area) and the menu 114 for selecting paper size are displayed. When a user selects a desired paper size, as shown in FIG. 4C, the contents are scaled down or scaled up according to the selected paper size so as to convert to an electronic document. Then, the electronic document 35 is generated.

FIGS. 5A, 5B and 5C are diagrams illustrating a third example of the method for electronic documentation.

Here, similar to the case shown in FIG. 3, the case of the electronic documentation of a whole mapping diagram of the content objects in FIG. 2 is considered, but a method for designating the portion desired to be converted to an electronic document is different from FIG. 3. That is, L shapes are formed with thumbs and index fingers of both hands to designate an upper left point and a lower right point of the portion desired to be converted to an electronic document. Then, the display and the electronic documentation are performed similarly to the case shown in FIG. 3.

Next, a method for transferring content objects to a working space to have no concept of the output size frame is described. That is, the method for outputting content objects as an electronic document after transferring the content objects to the working space has been described above, but hereinafter, a method how to transfer content objects to the working space in the first place is described.

Figure 6A:
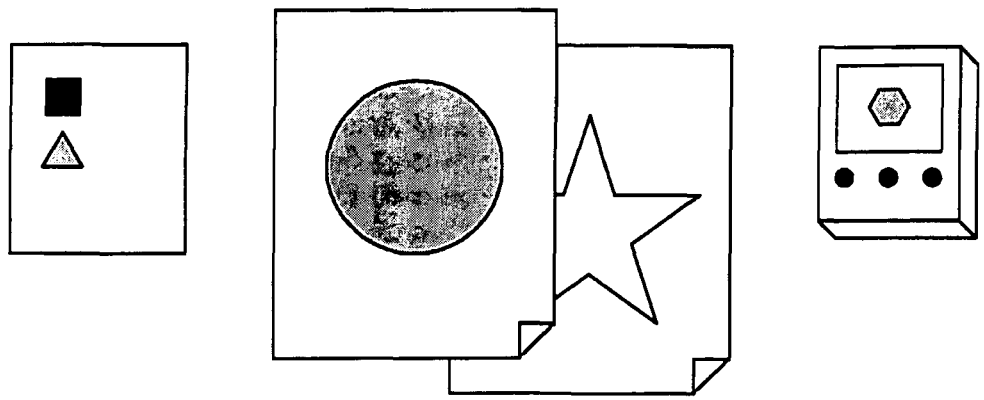
FIGS. 6A, 6B and 6C are diagrams for explaining comparison between a case in which contents objects are brought by a conventional method and the case by the method according to the present exemplary embodiment.
Figure 6B:
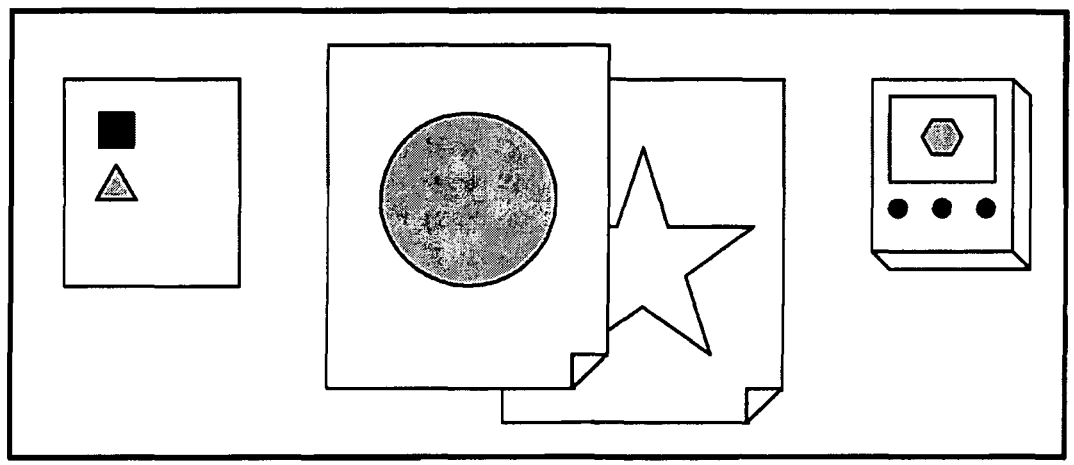
Figure 6C:
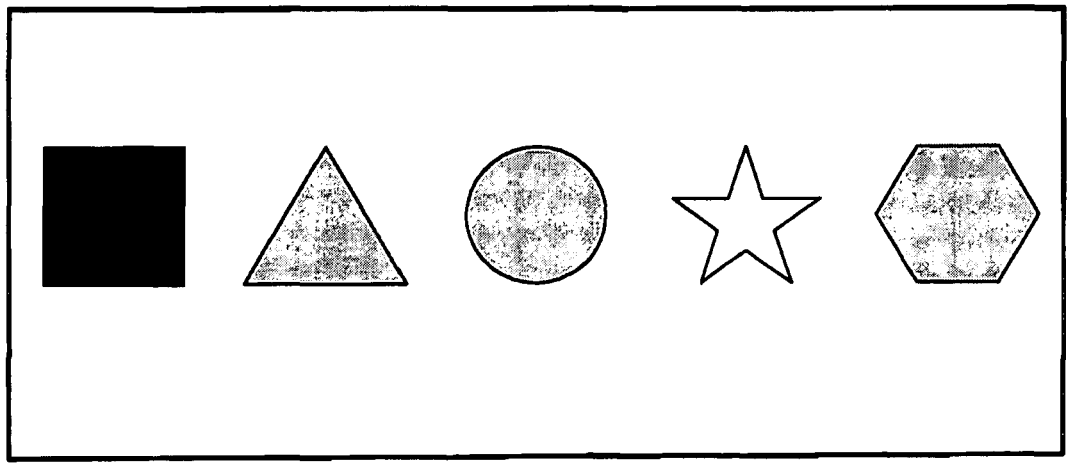

FIGS. 6A, 6B and 6C are diagrams for explaining comparison between a case in which contents objects are brought by a conventional method and the case by the method according to the present exemplary embodiment.

Generally, since meeting attendees bring contents with various media, variation in content sizes, margins of the media to content objects, background colors of the media and the like are observed.

In FIG. 6A, the specific examples are shown. It is assumed that the contents are brought by Attendee A, Attendee B and Attendee C in order from the left. Attendee A brings two ideas (represented by a square and a regular triangle) placed on electronic paper. Attendee B brings two ideas (represented by a circle and a star) placed on two sheets of paper with IDs in total, and each idea is placed on a sheet of paper with an ID. Attendee C brings one idea data (represented by regular hexagon) stored in an electronic terminal.

However, in the case where the ideas are brought with the various media as described above, it is very difficult to compare and review the ideas side by side and to perform operation for mapping and reconfiguration as shown in FIG. 6B. This is because operation for performing transfer to the same medium (such as scanning), conversion of contents to an object (such as clipping of each content), equalization of sizes and background colors and the like are troublesome.

Meanwhile, in the present exemplary embodiment, as shown in FIG. 6C, ideas brought by plural attendees may be compared on the same condition by uniforming content sizes, margins, and background colors.

Figure 7A:
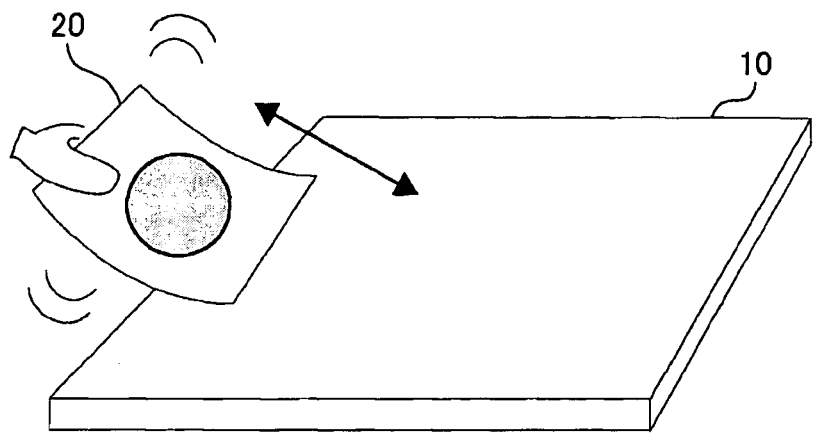
FIGS. 7A and 7B are diagrams illustrating a first example of the method for transferring a content object to the working space.
Figure 7B:
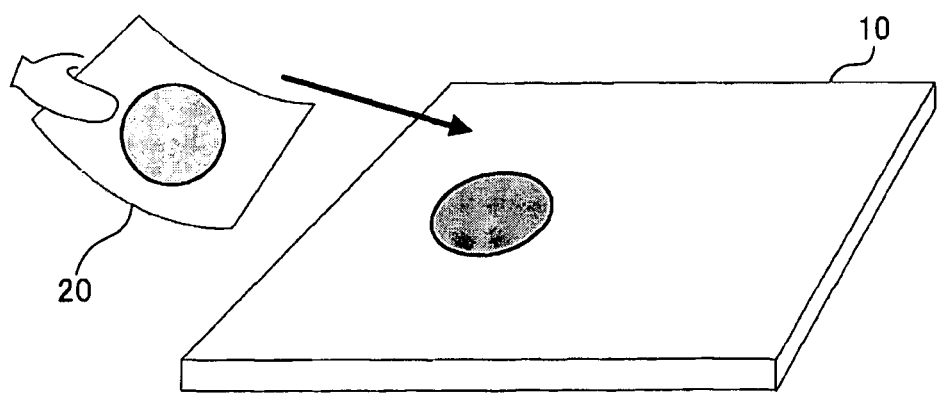

FIGS. 7A and 7B are diagrams illustrating a first example of a method for transferring a content object to the working space.

First, as shown in FIG. 7A, the paper medium 20 (a sheet of paper with an ID) is obliquely held over a horizontal type display apparatus 10 having a working space to have no concept of the output size frame, and is oscillated several times. Then, an acceleration sensor embedded in the paper medium 20 senses (detects) the oscillation. Further, with this as a trigger, a content object is acquired from the predetermined server, and an image is displayed as shown in FIG. 7B. That is, the content object recorded on the paper medium 20 transfers to the working space on the horizontal type display apparatus 10. Thus, operation including side-by-side comparison and review, and mapping reconfiguration may be performed on the working space to have no concept of output size frame by editing enlargement or reduction, rotation and the like.

In FIGS. 7A and 7B, the paper medium 20 is assumed as a medium to be oscillated over the horizontal type display apparatus 10, but other media may be also adopted. Such media may be considered to include, for example, electronic paper, a PC, a tablet PC, a PDA and the like. Further, in the case of using each of these media, an acceleration sensor embedded in the media senses the oscillation, and the information held in the media is transferred to the working space on the horizontal type display apparatus 10.

Furthermore, although the oscillation of the media is sensed by the acceleration sensor here, any other methods may be used as long as the oscillation of the media is detected by the methods. For example, each of the media is attached with a RFID (Radio Frequency Identification) tag, and the detection may be performed by access to a sensing area of the RFID reader by a RFID tag. Furthermore, detection may be performed by analysis of an image obtained by taking an image of each of the media from a side of the horizontal type display apparatus 10.

Figure 8A:
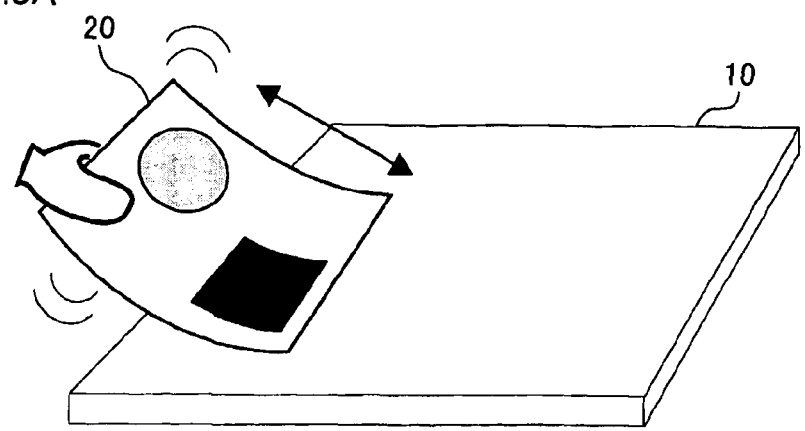
FIGS. 8A, 8B and 8C are diagrams illustrating a second example of the method for transferring the content object to the working space.
Figure 8B:
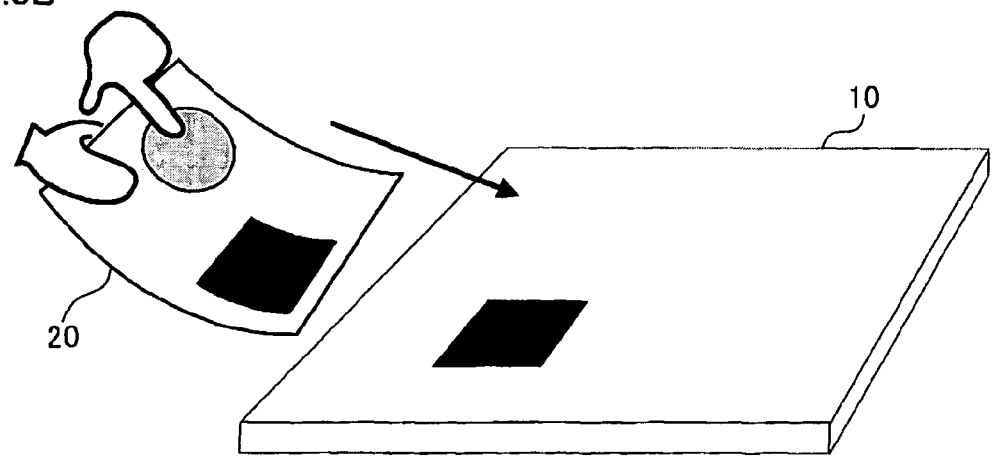
Figure 8C:
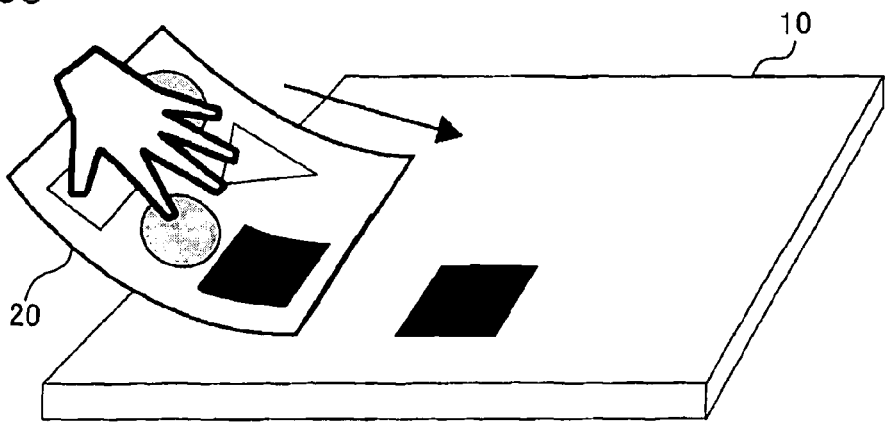

FIGS. 8A, 8B and 8C are diagrams illustrating a second example of the method for transferring the content object to the working space. In the example, it is assumed that plural content objects are placed on a sheet of the paper medium 20 (a sheet of paper with an ID). In addition, it is also assumed that, when, for example, the content objects are printed on the paper medium 20, an object ID is generated for each content object, and the object ID and the content object associated with each other are registered on the predetermined server. For example, content objects may be differentiated and registered by using a program in which an individual content object is recognized based on density among content objects.

In the example, the paper medium 20 (a sheet of paper with an ID) is first obliquely held over the horizontal type display apparatus 10 having a working space to have no concept of output size frame, and the paper medium 20 is oscillated several times as shown in FIG. 8A. As shown in FIG. 8B, when a user does not desire to transfer an object onto the working space, the user may put a finger on the object immediately after oscillating the object so that only the other object on which the user does not put a finger transfers to the working space. For example, the paper medium 20 is embedded with a touch sensor (for example, a pressure sensor), and content objects having been pressed may be sensed as content objects not to be transferred. Alternatively, by touching the surface of the paper medium 20 with an electronic pen (refer to FIG. 17) and the like that reads information from a code image after the code image is printed on the surface of the paper medium 20, the content object having been touched may be sensed as a content object not to be transferred.

Further, as shown in FIG. 8C, a touch sensor detecting touches in multiple points may be embedded to designate plural content objects not to be transferred.

In FIGS. 8A, 8B and 8C, the paper medium 20 is assumed as a medium to be oscillated over the horizontal type display apparatus 10, but other media may be also adopted. Such media may be considered to include, for example, electronic paper, a PC, a tablet PC, a PDA and the like. Further, in the case of using each of these media, an acceleration sensor embedded in the media senses the oscillation, and the specified information included in the information held in the media is transferred to the working space on the horizontal type display apparatus 10.

Furthermore, although the oscillation of the media is also sensed by the acceleration sensor here, any other methods may be used as long as the oscillation of the media is detected by the methods. For example, each of the medium is attached with a RFID (Radio Frequency Identification) tag, and detection may be performed by access to a sensing area of the RFID reader by a RFID tag. Furthermore, detection may be performed by analysis of an image obtained by taking an image of each of the media from a side of the horizontal type display apparatus 10.

Figure 9A:
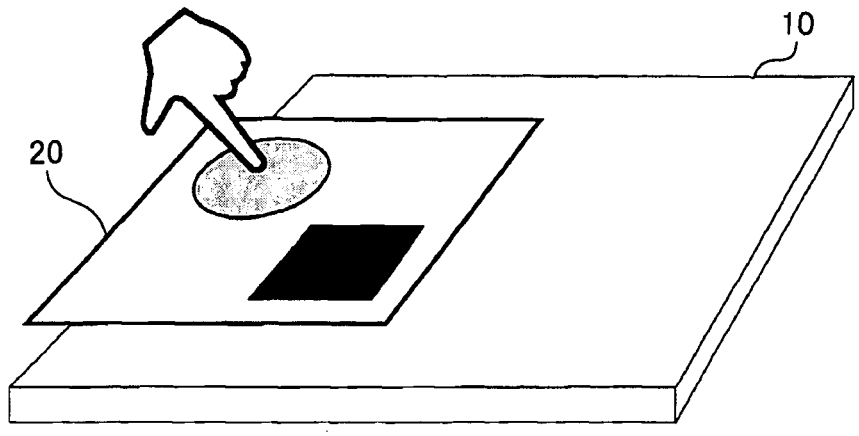
FIGS. 9A, 9B and 9C are diagrams illustrating a third example of the method for transferring the content object to the working space.
Figure 9B:
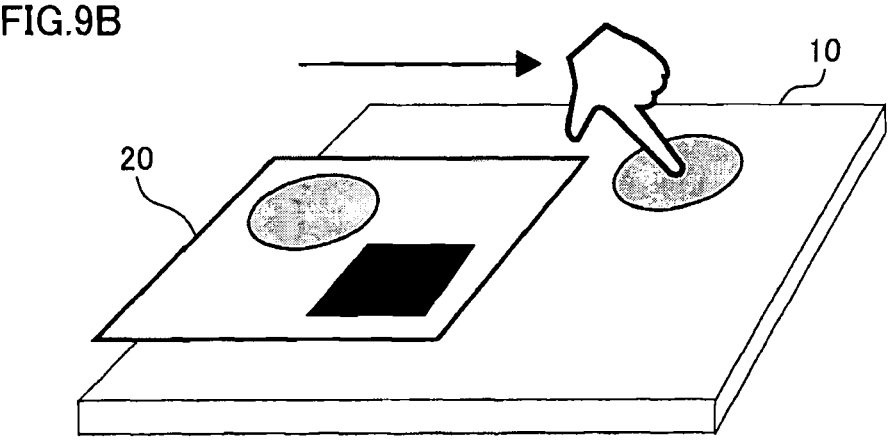
Figure 9C:
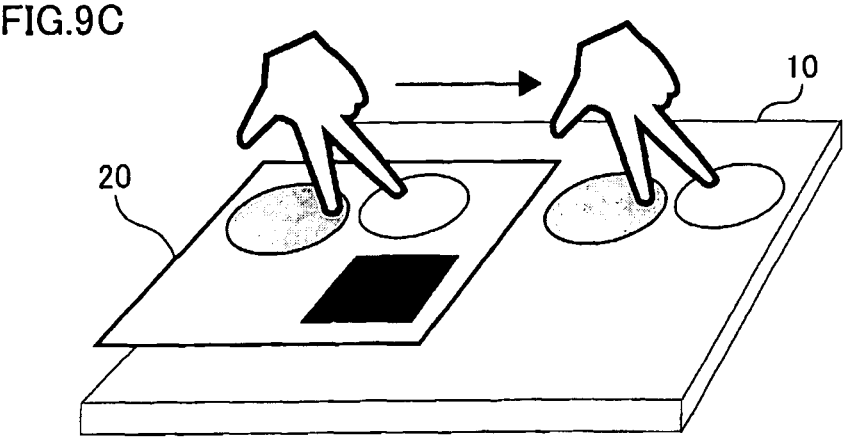

FIGS. 9A, 9B and 9C are diagrams illustrating a third example of the method for transferring the content object to the working space.

First, as shown in FIG. 9A, the paper medium 20 (a sheet of paper with an ID) is placed on a horizontal type display apparatus 10 having a working space to have no concept of the output size frame, and a content object to be transferred is touched with a finger. Then, the pressed content object is detected by a touch sensor (for example, a pressure sensor) embedded in the horizontal type display apparatus 10. Further, as shown in FIG. 9B, when the finger is dragged while pressing the content object and is released, the content object is transferred from the predetermined server to the position in which the finger is released so as to generate the image.

Furthermore, as shown in FIG. 9C, a touch sensor detecting touches in multiple points may be embedded so as to transfer plural content objects at a time.

In FIGS. 9A, 9B and 9C, the paper medium 20 is assumed as a medium to be placed on the horizontal type display apparatus 10, but other media may be also adopted. Such media may be considered to include, for example, electronic paper, a PC, a tablet PC, a PDA and the like. Further, in the case of using each of these media, the information held in the media is transferred to the working space on the horizontal type display apparatus 10.

Figure 10A:
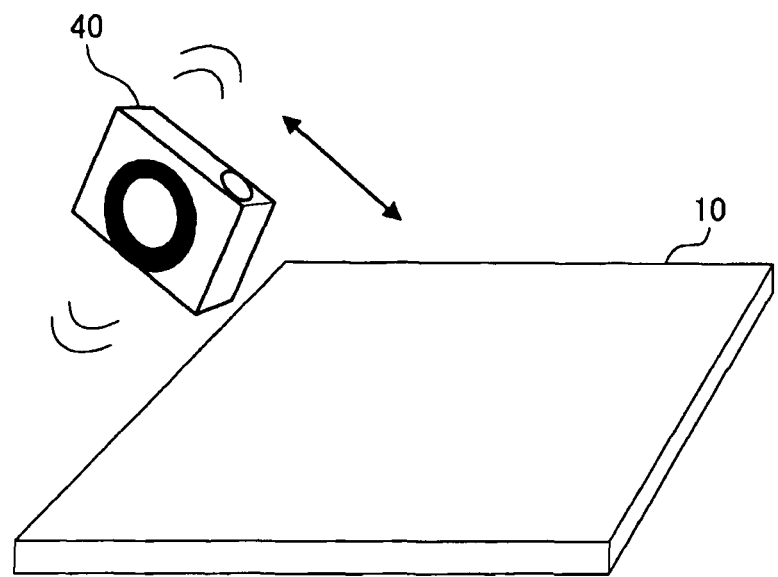
FIGS. 10A and 10B are diagrams illustrating a fourth example of the method for transferring the content object to the working space.
Figure 10B:
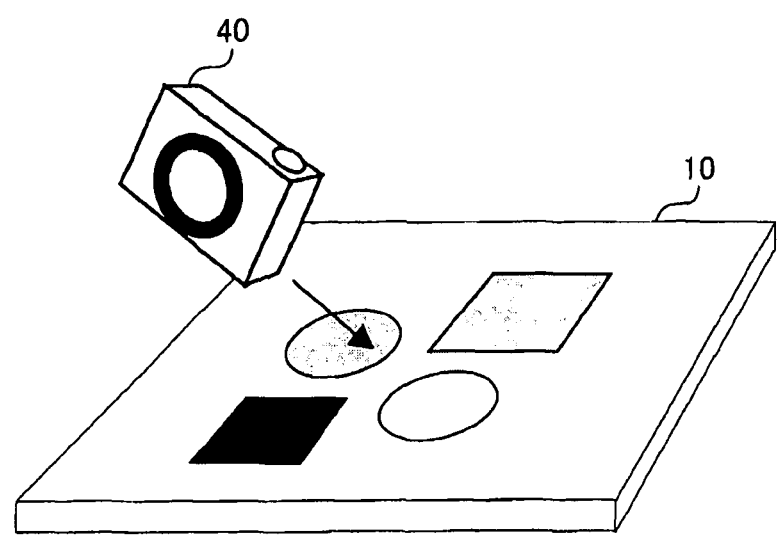

FIGS. 10A and 10B are diagrams illustrating a fourth example of the method for transferring the content object to the working space. In the example, it is assumed that contents are brought with a digital camera (simply referred to as "camera" hereinafter) 40. Here, the camera 40 holds plural images including an image that is provided with plural content objects on one sheet. Further, a code image is adhered to, for example, a bottom of the camera 40.

In the example, as shown in FIG. 10A, the camera 40 is first obliquely held over the horizontal type display apparatus 10 having a working space to have no concept of output size frame and is oscillated several times. Then, an acceleration sensor embedded in the camera 40 senses (detects) the oscillation. Further, with this as a trigger, an ID of the camera 40 and images in the camera 40 are transferred to the predetermined server. Furthermore, an individual content object is converted to an object by a program recognizing content objects from images, and, as shown in FIG. 10B, content objects are displayed on the horizontal type display apparatus 10.

In this case, among the images in the camera 40, an image to be transferred may be set in the condition for selection by a user, and only the image set in the condition for selection may be transferred to the horizontal type display apparatus 10.

Further, although the oscillation of the camera 40 is sensed by the acceleration sensor here, any other methods may be used as long as the oscillation of the camera 40 is detected by the methods. For example, the camera 40 is attached with a RFID (Radio Frequency Identification) tag, and detection may be performed by access to a sensing area of the RFID reader by a RFID tag. Furthermore, detection may be performed by analysis of an image obtained by taking an image of the camera 40 from a side of the horizontal type display apparatus 10.

Figure 11A:
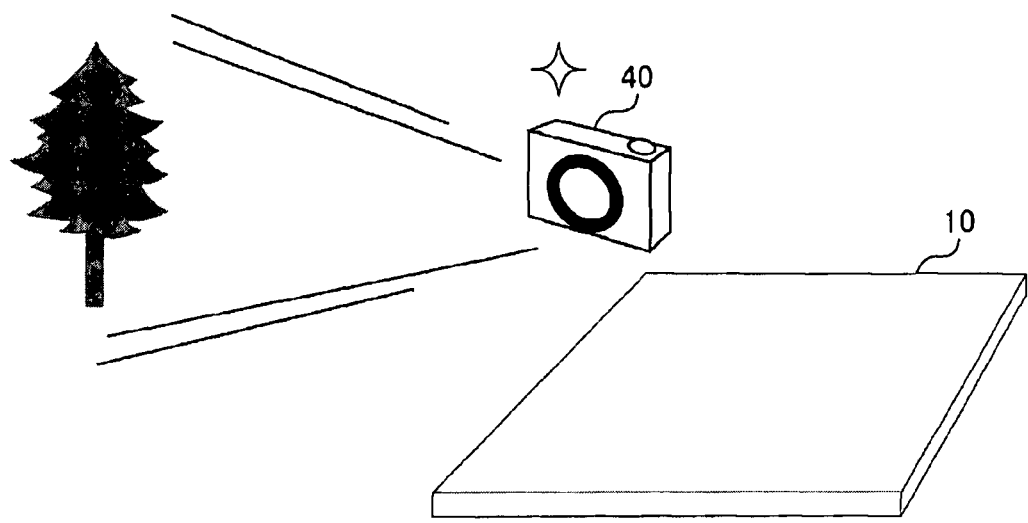
FIGS. 11A and 11B are diagrams illustrating a fifth example of the method for transferring the content object to the working space.
Figure 11B:
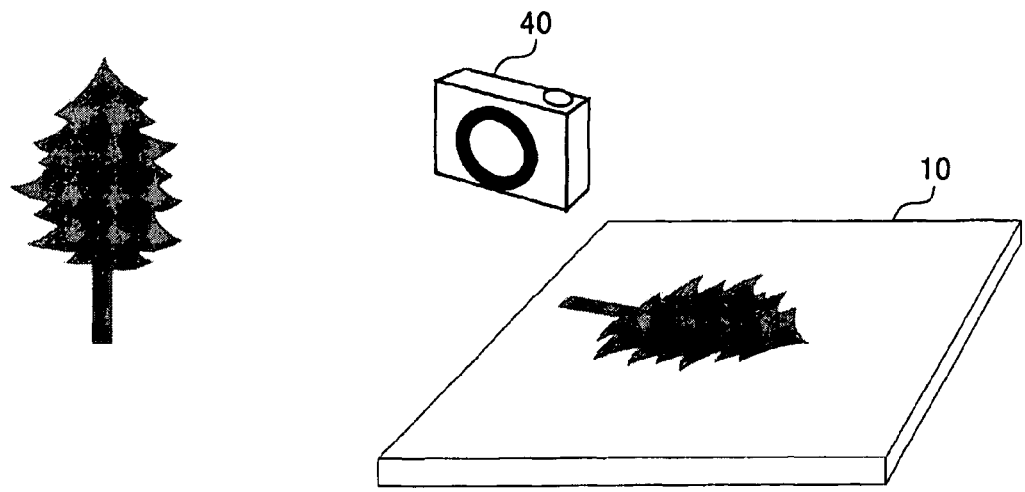

FIGS. 11A and 11B are diagrams illustrating a fifth example of the method for transferring the content object to the working space.

In the example, as shown in FIG. 11A, first a shutter button of the camera 40 is pressed. Then, an ID of the camera 40 and an image just now taken are transmitted to the predetermined server, content objects of the image are individually converted to objects by the program for recognizing content objects from a image, and, as shown in FIG. 11B, the content objects are displayed on the horizontal type display apparatus 10. This is an example in which the physical contents which were shot seem to be instantaneously transferred to the horizontal type display apparatus 10 for a user.

Next, a configuration of a display system 100, which is an example of a document generating apparatus of the present invention, realizing outline of the operation is described.

Figure 12:
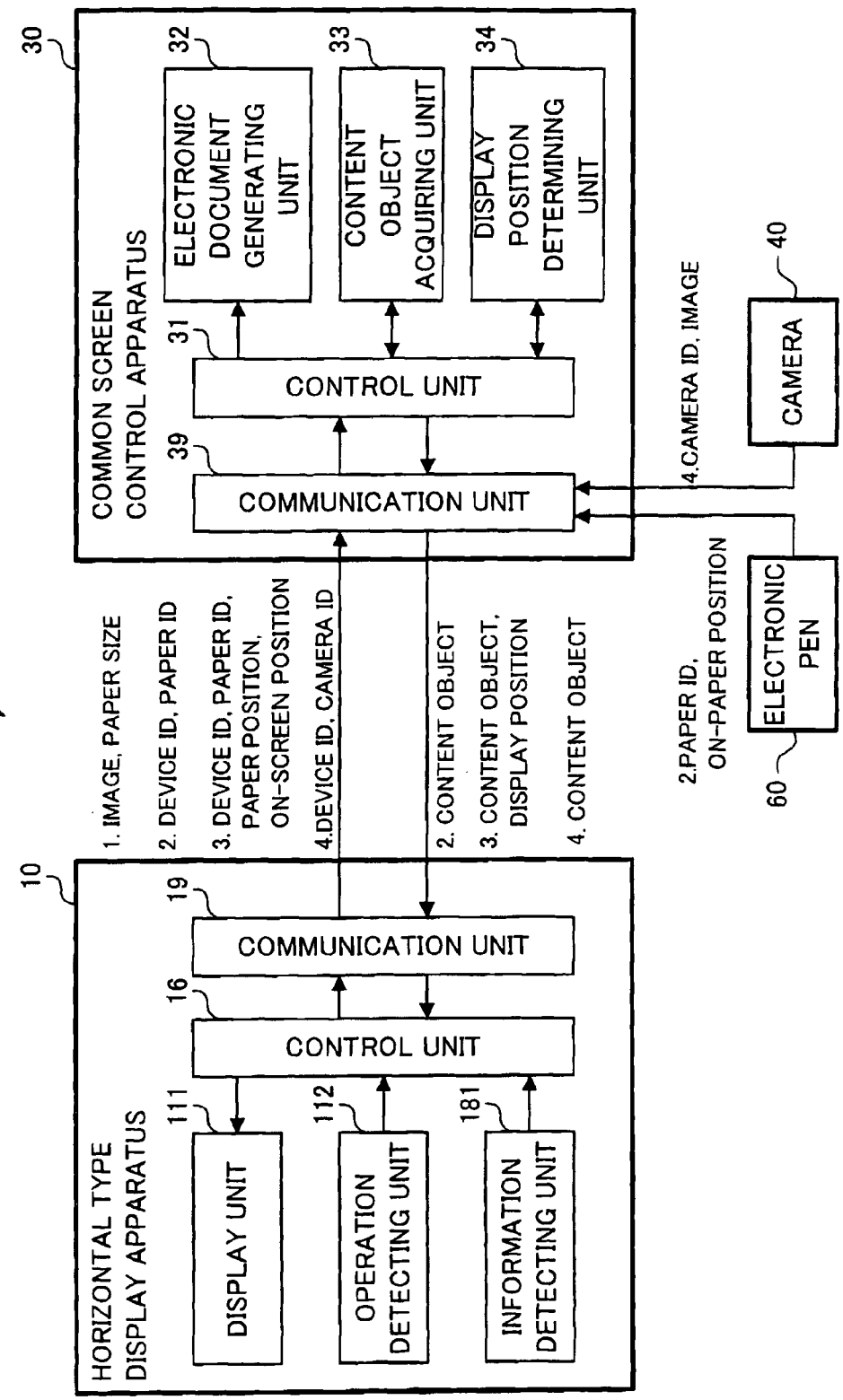
FIG. 12 is a diagram illustrating an example of the configuration of the display system in the present exemplary embodiment.

FIG. 12 is a diagram illustrating an example of the configuration of the display system 100 in the present exemplary embodiment.

As shown in FIG. 12, the display system 100 of the present exemplary embodiment includes the horizontal type display apparatus 10 and a common screen control apparatus 30 that controls the common screen on the horizontal type display apparatus 10. The common screen control apparatus 30, which is an example of a display control apparatus of the present invention, may be connected with an electronic pen 60 or a camera 40 in some cases. Between the horizontal type display apparatus 10 and the common screen control apparatus 30, between the electronic pen 60 and the common screen control apparatus 30, and between the camera 40 and the common screen control apparatus 30 are connected by, for example, LAN (wired or wireless) and the like. Here, information sent and received between the apparatuses is also shown in FIG. 12. Numerals attached to the information correspond to the operational examples described later. That is, Numerals "1," "2," "3" and "4" respectively show information sent and received in a first operational example, a second operational example, a third operational example, and a fourth operational example.

Here, a functional configuration of inside of each apparatus is described.

The horizontal type display apparatus 10 includes a display unit 111, an operation detecting unit 112, an information detecting unit 181, a control unit 16 and a communication unit 19. The display unit 111 performs a process for displaying images, an operation detecting unit 112 detects operation on the display screen, an information detecting unit 181 detects an ID of the paper medium 20 (referred to as "paper ID" hereinafter) and the like, the control unit 16 controls operation of each section, and the communication unit 19 sends information to the common screen control apparatus 30 and receives information from the common screen control apparatus 30.

The display unit 111 reflects a content object that the communication unit 19 has received from the common screen control apparatus 30 on a currently displayed image stored in a memory so as to generate a new image, and the new image is outputted to the projector 15. In some cases, the communication unit 19 may arrange the content objects according to information of the display position that the communication unit 19 has received from the common screen control apparatus 30, and may generate a new image.

The operation detecting unit 112 receives a signal related to user operation from the touch panel function of the tabletop 11, and detects a content of the operation. The content of the operation includes designation of an area for electronic documentation, selection of a paper size for electronic documentation, and designation of a position of a content object to be transferred and a position of a destination on the tabletop 11 (referred to as "on-screen position" hereinafter).

The information detecting unit 181 detects a paper ID by analyzing an image that is taken by the infrared camera 18. The information detecting unit 181 may also detect a position of the paper medium 20 on the tabletop 11 (referred to as "paper position" hereinafter) in some cases.

The control unit 16 passes the display unit 111 a content object and the like received from the communication unit 19, and passes the communication unit 19 information received from the operation detecting unit 112 or the information detecting unit 181.

The communication unit 19 sends the common screen control apparatus 30 information of user operation that designates an area of an image displayed on the tabletop 11 and information of user operation that sets a paper size for electronic documentation. Further, the communication unit 19 sends the ID of its own and the paper ID to the common screen control apparatus 30, and receives content objects from the common screen control apparatus 30. Alternatively, the communication unit 19 sends the ID of its own, the paper ID, the paper position, and the on-screen positions corresponding to source and destination of transfer of the content objects to the common screen control apparatus 30, and receives information on the content objects and display positions from the common screen control apparatus 30. Furthermore, the communication unit 19 may send the ID of its own and the ID of the camera 40 (referred to as "camera ID" hereinafter) to the common screen control apparatus 30 and may receive the content objects from the common screen control apparatus 30 in some cases.

The common screen control apparatus 30 includes a control unit 31, an electronic document generating unit 32, a content object acquiring unit 33, a display position determining unit 34 and a communication unit 39. The control unit 31 controls operation of each unit, the electronic document generating unit 32 generates electronic documents, the content object acquiring unit 33 acquires content objects, the display position determining unit 34 determines the display position of content objects on the tabletop 11, and the communication unit 39 sends information to the horizontal type display apparatus 10 and receives information from the horizontal type display apparatus 10.

The control unit 31 passes the image and the paper size received from the communication unit 39 to the electronic document generating unit 32. Further, the control unit 31 acquires an on-paper position for acquiring content objects, and transmits the on-paper position to the content object acquiring unit 33 so as to make the content objects acquired. Furthermore, the control unit 31 sends back the acquired content objects to the communication unit 39 to be displayed on the horizontal type display apparatus 10. That is, in the present exemplary embodiment, the control unit 31 is provided as an example of a position identification unit for identifying a position on the surface of a medium of the present invention, and as an example of a controller for controlling image elements to be displayed on the display screen of the present invention. Furthermore, the control unit 31 controls the display position determining unit 34 to determine a display position.

The electronic document generating unit 32 adjusts the images received from the horizontal type display apparatus 10 in the paper size so as to generate an electronic document. That is, in the present exemplary embodiment, the electronic document generating unit 32 is provided as an example of an adjusting unit for adjusting images of the present invention or as an example of a generating device for generating electronic documents of the present invention.

The content object acquiring unit 33 identifies the content object for display based on the paper ID sent from the horizontal type display apparatus 10 and the on-paper position obtained by the predetermined method, and acquires the content object from a memory not shown in the figure. Alternatively, the content object may be acquired by analyzing an image sent from the camera 40 in some cases. That is, in the present exemplary embodiment, the content object acquiring unit 33 is provided as an example of an image identification unit for identifying image elements of the present invention.

The display position determining unit 34 determines a display position of the content object according to an on-screen position when the on-screen position is sent from the horizontal type display apparatus 10.

The communication unit 39 receives from the horizontal type display apparatus 10 the information of the user operation for designating an image area displayed on the tabletop 11 and the information of the user operation for setting paper size for electronic documentation. That is, in the present exemplary embodiment, the communication unit 39 is provided as an example of an acquiring unit for acquiring information on the first operation that designates a predetermined area and the second operation that sets the size of a medium of the present invention.

Further, the communication unit 39 receives an ID of the horizontal type display apparatus 10 (referred to as "a device ID" hereinafter) and a paper ID from the horizontal type display apparatus 10, and sends the content objects to the horizontal type display apparatus 10. Alternatively, the communication unit 39 receives the device ID, the paper ID, the paper position and the on-screen positions corresponding to source and destination of transfer of the content object from the horizontal type display apparatus 10, and the communication unit 39 send information on the content objects and display positions to the horizontal type display apparatus 10. Further, the communication unit 39 may receive the apparatus ID and the camera ID from the horizontal type display apparatus 10, and may send the content objects to the horizontal type display apparatus 10 in some cases. Furthermore, the communication unit 39 receives the paper ID and the on-paper position from an electronic pen 60 when the electronic pen 60 is connected, or the communication unit 39 receives the camera ID and the image from the camera 40 when the camera 40 is connected. In this case, the communication unit 39 also receives information of the oscillation of the paper medium 20 or the oscillation of the camera 40. That is, in the present exemplary embodiment, the communication unit 39 is provided as an example of a medium identification unit for identifying the medium of the present invention, or as an example of a first acquiring unit for acquiring information of oscillation of the medium of the present invention.

Although FIG. 12 shows the display system 100 in which a single common screen control apparatus 30 is connected with a single horizontal type display apparatus 10, a single common screen control apparatus 30 may be connected with plural horizontal type display apparatuses 10. Further, although the common screen control apparatus 30 is provided separately from the horizontal type display apparatus 10, the common screen control apparatus 30 may be integrated with the horizontal type display apparatus 10. However, in case of adopting the configuration, the device ID is not required to be managed as described later because the common screen control apparatus 30 no longer manages plural horizontal type display apparatuses 10 as a whole.

Next, operation in the display system 100 of the present exemplary embodiment is described. As described below, a process for electronic documentation by the method shown in FIGS. 3 to 5 is exemplified as a first operational example, a process for transferring content objects by the method shown in FIG. 8 is exemplified as a second operational example, a process for transferring content objects by the method shown in FIG. 9 is exemplified as a third operational example, and a process for transferring content objects by the method shown in FIGS. 10 and 11 is exemplified as a fourth operational example.

First, the first operational example is described.

Figure 13:
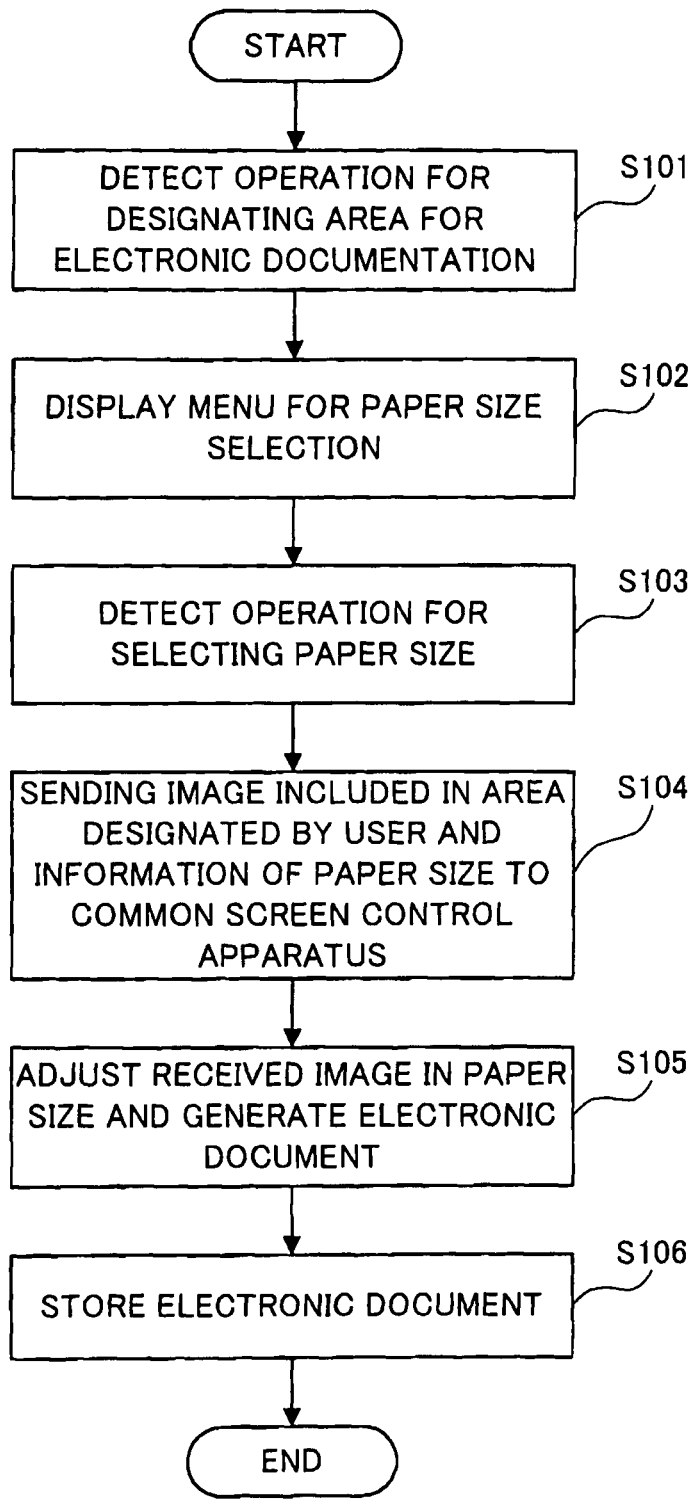
FIG. 13 is a flowchart illustrating an entire process of the first operational example.

FIG. 13 is a flowchart illustrating a flow of the first operational example.

First, as shown in FIGS. 3 to 5, a user encloses an area in which electronic documentation is performed. Thereby, the operation detecting unit 112 detects the user's operation (step 101). Then, information on the user's operation is transmitted to the control unit 16, and the display unit 111 displays a menu for paper size selection under the control of the control unit 16 (step 102).

When the menu is displayed, as shown in FIGS. 3 to 5, the user selects a desired paper size among the paper sizes displayed. Thereby, the operation detecting unit 112 detects the user's operation (step 103). Subsequently, information on the user's operation is transmitted to the control unit 16, and the control unit 16 transmits the image included in the area designated by the user's enclosing in step 101 among images displayed on the tabletop 11 and the information on the paper size that the user set in step 103 to the communication unit 19. Further, the communication unit 19 sends the image and the information of the paper size to the common screen control apparatus 30 (step 104).

Thereby, the communication unit 39 receives the image and the information of the paper size in the common screen control apparatus 30. Furthermore, they are transmitted to the control unit 31, and the control unit 31 transmits them to the electronic document generating unit 32 so as to instruct generation of an electronic document. Thereby, the electronic document generating unit 32 adjusts the received image in the paper size, and generates the electronic document (step 105).

Here, with regard to a specific method for adjusting the image, there is the following method as an example.

First, an enlargement or reduction percentage (A) is calculated for enlarging or reducing the vertical length of the image desired to be an electronic document to the vertical length of the paper size. Next, an enlargement or reduction percentage (B) is calculated for enlarging or reducing the horizontal length of the image desired to be an electronic document to the horizontal length of the paper size. Then, the whole image is enlarged or reduced by using the lower enlargement or reduction percentage between A and B. Thus the largest image within the paper size is obtained without changing a ratio of vertical and horizontal length of the original image.

Further, the electronic document generated in this manner is stored in a memory not shown in the figure (step 106).

In the above operational example, the horizontal type display apparatus 10 performs the aforementioned process until the process for detecting the user's operation (steps 101 to 104), and the common screen control apparatus 30 performs the process for adjusting the image in the paper size and the process for generating the electronic document (steps 105 and 106). However, the horizontal type display apparatus 10 may perform the aforementioned process until the process for adjusting the image in the paper size (step 101 to a first half of step 105), and the common screen control apparatus 30 may perform only the process for generating the electronic document (a second half of step 105 and step 106). Alternatively, the horizontal type display apparatus 10 performs the aforementioned process until the process for generating the electronic document (steps 101 to 105), and the common screen control apparatus 30 may only store and manage the electronic document (step 106).

Next, the second operational example is described. Here, a position on the paper medium 20 (an on-paper position) is instructed with an electronic pen 60 (refer to FIG. 17) by which an image is readable, while a position on the paper medium 20 is pressed with a finger in FIG. 8.

Figure 14:
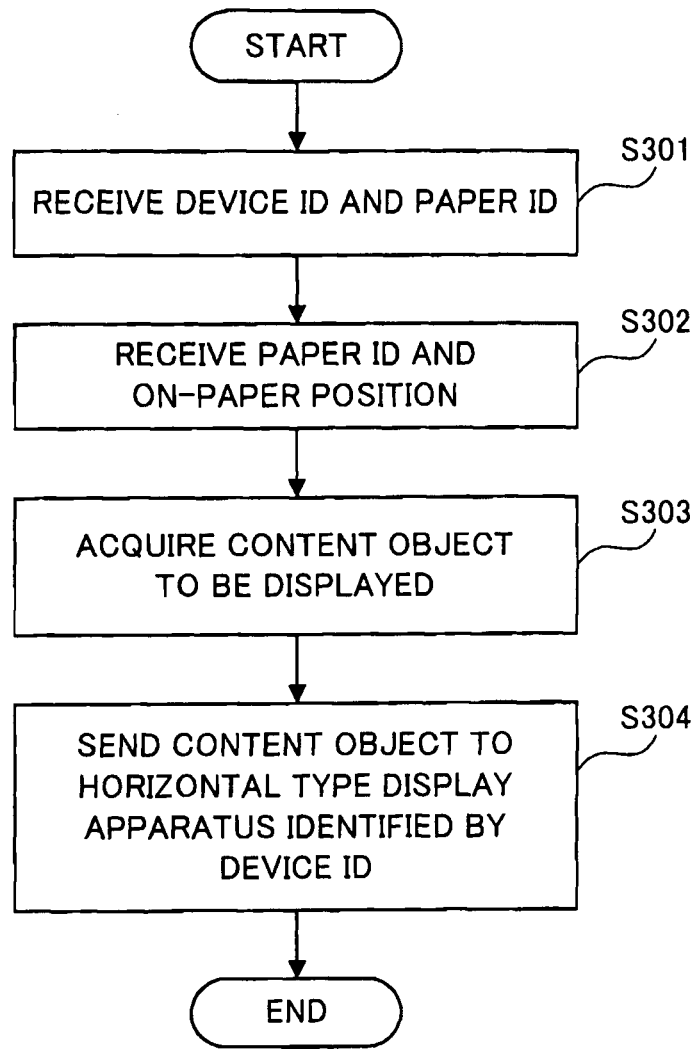
FIG. 14 is a flowchart illustrating an entire process of the second operational example.

FIG. 14 is a flowchart illustrating a flow of the second operational example.

In the second operational example, first the information detecting unit 181 reads a code image 26 printed on the back surface of the paper medium 20 so as to detect the paper ID in the horizontal type display apparatus 10.

The code image 26 printed on the back surface of the paper medium 20 is described below.

FIGS. 15A and 15B are diagrams illustrating an example of images and the like configuring the code image 26.

First, a unit pattern configuring the code image 26 is described.

FIG. 15A shows an example of a unit pattern.

The unit pattern is a minimum unit that is embedded with information. In FIGS. 15A and 15B, black areas and shaded areas are areas in which dots are assignable, and white areas between thereof are areas in which dots are not assignable. Further, among areas in which dots are assignable, the black area indicates that a dot is assigned, and the shaded area indicates that a dot is not assigned. That is, in the example of FIGS. 15A and 15B, a unit pattern is configured by assigning dots to two areas selected from nine areas in which dots are assignable. Here, there are thirty-six ways ($36 = {}_9C_2$) of combination for selection of two area from nine areas, and thereby 36 types of unit patterns exists. Among them, four (4) types of the unit patterns are used as synchronous patterns. The synchronous pattern is a pattern for detecting rotation of an image and for identifying a position relative to the identification code. Particularly, since the rotation of an image is required to be detected, as four types of the synchronous patterns, the patterns are selected from the unit patterns in such a manner that one of the synchronous patterns becomes other synchronous pattern when it is rotated 90 degrees. In addition, 32 types of the unit patterns except these four types of the unit patterns are used as information patterns expressing identification codes, and five bit information is expressed.

Meanwhile, dots shown in FIG. 15A are just the dots for information expression, but they do not necessarily correspond to the dots indicating the minimum points configuring an image. In the present exemplary embodiment, the dot for information expression (the minimum square in FIG. 15A) has a size of two dots by two dots of 600 dpi. Since the size of one dot of 600 dpi is substantially 0.0423 mm, one side of the information expression dot (the minimum square in FIG. 15A) is substantially 84.6 μm (=0.0423 mm×2). Since the information expression dot is more visible as it becomes larger, preferable size is as smaller as possible. However, when dot is too small, it is not printable with a printer. Therefore, the above described value of not less than 50 μm and not more than 100 μm is adopted as a size of the dot for information expression. However, the above described value of 84.6 μm is just a calculational value, so a toner image actually printed becomes approximately 100 μm.

Next, a code block configured by such unit patterns is described.

FIG. 15B shows an example of a layout of the code block. Here, not an image but code array immediately before being substituted by a pattern image is shown. That is, a unit pattern (any one of 36 ways of unit patterns) as shown in FIG. 15A is arranged in the minimum square (referred to as a "unit block" hereinafter) of FIG. 15B, and the image is formed on the medium.

In the layout of FIG. 15B, a synchronous code is arranged in one unit block on upper left side of the code block. Further, identification codes are arranged in four unit blocks on the right side of the unit block in which the synchronous code is arranged, in four unit blocks under the unit block in which the synchronous code is arranged, and further, in 16 (=4×4) unit blocks surrounded by these unit blocks.

In the present exemplary embodiment, the paper ID is encoded, and it is assumed that the coded paper ID is an identification code of the code image 26. Thus the paper ID is acquired by analyzing the image taken by the infrared camera 18, and thereby which paper medium 20 is placed on the horizontal type display apparatus 10 is identified.

There are K toner (black toner containing carbon) and a special toner used for forming the code image 26.

Here, as a special toner, an invisible toner that has the maximum absorption rate of not more than 7 percents in the visible light region (400 nm to 700 nm) and has an absorption rate of not less than 30 percents in the near infrared region (800 nm to 1000 nm) is exemplified. However, with regard to "visible" and "invisible," they are independent of recognition with eyes. "Visible" and "invisible" are differentiated based on whether the code image is recognized by the presence or absence of a chromogenic property due to absorption of a specific wavelength in the visible light region. Additionally, "invisible" includes the region that is difficult to be recognized with human eyes and that has a little chromogenic property due to absorption of specific wavelength in the visible light region.

Here, to return to FIG. 14, the description of the operation is continued.

When the information detecting unit 181 detects a paper ID from such a code image 26, the information detecting unit 181 transmits the paper ID to the control unit 16. Then, the control unit 16 further transmits the paper ID to the communication unit 19, and the communication unit 19 sends the device ID of its own and the paper ID to the common screen control apparatus 30. Thereby, in the common screen control apparatus 30, the communication unit 39 receives the information (step 301). Further, received information is transmitted to the control unit 31.

In the second operational example, the electronic pen 60 (refer to FIG. 17) indicates the on-paper position on which the content object desired not to be transferred among the content objects printed on the paper medium 20 is printed. Therefore, the electronic pen 60 detects the paper ID and the on-paper position.

Now, the code image that is printed on a surface (the other side of the back surface) of the paper medium 20 is described.

FIGS. 16A and 16B are diagrams illustrating another example of the images and the like configuring the code image.

FIG. 16A shows an example of the unit pattern configuring the code image. Since it is similar to the example described with reference to FIG. 15A, the description is omitted. However, while in FIG. 15A, information patterns that is unit patterns other than synchronous patterns are described as expression of only identification codes, in FIG. 16, not only identification codes but also position codes are expressed as described later.

Next, a code block configured by such unit patterns is described.

FIG. 16B shows another example of a layout of the code block. Here, not an image but code array immediately before being substituted by a pattern image is shown. That is, a unit pattern (any one of thirty-six ways of unit patterns) as shown in FIG. 16A is arranged in the minimum square (a unit block) of FIG. 16B, and the image is formed on the medium.

In the layout of FIG. 16B, a synchronous code is arranged in one unit block on upper left side of the code block. Further, X position codes are arranged in four unit blocks on the right side of the unit block in which the synchronous code is arranged, and Y position codes are arranged in four unit blocks under the unit block in which the synchronous code is arranged. Furthermore, identification codes are arranged in 16 (=4×4) unit blocks surrounded by the unit cords in which these position codes are arranged.

In the present exemplary embodiment, the paper ID is encoded, and it is assumed that the coded paper ID is an identification code of the code image. Further, coordinates of a position on the paper medium 20 are coded, and it is assumed that the coded coordinates are a position code of the code image. Thus the paper ID and the on-paper position are acquired by analyzing the image taken by the infrared camera of the electronic pen 60, and thereby which position is indicated on the paper medium 20 is identified.

Additionally, as toner used for forming the coded image 26, the toner like that described with reference to FIGS. 15A and 15B is preferably used.

Here, the electronic pen 60 that detects the paper ID and the on-paper position is described.

FIG. 17 is a diagram illustrating an example of a configuration of the electronic pen 60.

As shown in FIG. 17, the electronic pen 60 is provided with a control circuit 61 that controls operation of the whole pen. Further, the control circuit 61 includes an image processing portion 61a that processes code images read by an infrared CMOS 64 (later described) and a data processing portion 61b that extracts identification information and position information based on the processing results.

Furthermore, the control circuit 61 is connected with a pressure sensor 62 that detects writing operation of the electronic pen 60 by pressure applied to a pen tip 69. Furthermore, the control circuit 61 is also connected with an infrared LED 63 that irradiates infrared light on the medium and an infrared CMOS 64 that reads code images by detecting reflected light. Furthermore, the control circuit 61 is connected with an information memory 65 that stores the identification information and the position information, a communication circuit 66 that communicates with external devices, a battery 67 that drives the pen, and a pen ID memory 68 that stores identification information of the pen (a pen ID).

Here, to return to FIG. 14, the description of the operation is continued.

When the electronic pen 60 detects the paper ID and the on-paper position, the paper ID is stored as identification information and the on-paper position is stored as position information in the information memory 65. Then, the paper ID and the on-paper position are sent to the common screen control apparatus 30 through the communication circuit 66. Thereby, in the common screen control apparatus 30, the communication unit 39 receives the information (step 302). Further, the received information is transmitted to the control unit 31.

At this moment, the control unit 31 holds the device ID and the paper ID sent from the horizontal type display apparatus 10 and the paper ID and the on-paper position sent from the electronic pen 60. Under this condition, for example, when information on the oscillation of the paper medium 20 is received from the horizontal type display apparatus 10, the control unit 31 transmits the paper ID and the on-paper position to the content object acquiring unit 33 so as to instruct acquisition of the content object. In this case, the oscillation of the paper medium 20 may be detected by the access to the sensing area of the RFID, analysis of an image obtained as a result of taking an image of the paper medium 20 and the like as described above. Further, information on the oscillation of the paper medium 20 may be received together with the device ID and the paper ID in step 301.

By an instruction from the control unit 31, the content object acquiring unit 33 identifies the content object to be displayed on the horizontal type display apparatus 10 based on the paper ID and the on-paper position, and reads the identified content object from the memory not shown in figures (step 303). Further, the read content object is returned to the control unit 31.

In the process, specifically, the identification of the content object is based on management information that manages to identify paper, a position on the paper and a content object arranged at the position on the paper.

Here, a content object management table as an example of the control information is described.

FIG. 18 is a table illustrating an example of specific contents of the content object management table.

This content object management table makes a connection among the paper ID, an object ID for specifically identifying the content object, central coordinates of the content object, a shape of the content object and a shape parameter for determining the shape of the content object.

Further, FIG. 18 shows the managed portions of the paper mediums 20 of paper IDs "P001" and "P002." Furthermore, FIG. 18 also shows that content objects of object IDs "Q0011" and "Q0012" are arranged on the paper medium 20 of the paper ID "P001" and that content objects of the object IDs "Q0021," "Q0022," "Q0023," "Q0024" and "Q0025" are arranged on the paper medium 20 of the paper ID "P002."

Furthermore, the content object management table stores X-coordinate and Y-coordinate of the central point as central coordinates of each content object. Here, any point on the paper medium 20 may be set as an original point of a coordinate system for representing X-coordinate and Y-coordinate. For example, a left-upper point of the paper medium 20 may be set as an original point. Also, any point may be set as a central point. For example, a point to be a center of gravity may be set as a central point regardless of the shape. Alternatively, for each shape, a point may be predetermined as a central point.

As for the shape of the content object, various shapes are considered actually, but only the shapes of extremely basic figures are considered here to simplify the description.

Furthermore, the shape parameter is a value used for calculating which area around the central point is covered by the content object. Here, a shape parameter "R1" corresponding to the object ID "Q0011," a shape parameter "R3" to the object ID "Q0021" and a shape parameter "R6" to the object ID "Q0024" represent a radius of a circle respectively. Additionally, a shape parameter "La2" corresponding to the object ID "Q0012," a shape parameter "La5" to the object ID "Q0023" and a shape parameter "La7" to the object ID "Q0025" represent a length of one side of a square respectively. Further, a shape parameter "Lb4" corresponding to the object ID "Q0022" represents a length of one side of an equilateral triangle.

Therefore, the content object acquiring unit 33 first retrieves the content object management table by using a paper ID as a key, and identifies the content objects on the paper medium 20 that is identified by the paper ID. Then, an area of each content object is calculated based on the central coordinates and the shape parameters of the identified content objects. As a result, if there is a content object including an on-paper position, it is determined to be a content object that is not displayed on the horizontal type display apparatus 10 and the remaining content objects are identified as the content objects to be displayed. That is, in the second operational example, as an example of a predetermined condition for identifying the content object, a condition in which the content object is not printed at the designated position is adopted.

Then, the control unit 31 instructs the communication unit 39 to send the content object passed from the content object acquiring unit 33 to the horizontal type display apparatus 10 identified by the device ID that has been held in the control unit 31. Further, the communication unit 39 sends the instructed information to the instructed horizontal type display apparatus 10 (step 304). Thereby, in the horizontal type display apparatus 10, the communication unit 19 receives the content object, the content object is passed to the display unit 111 through the control unit 16, and the display unit 111 reflects the passed image of the content object to the previous images so as to output it to the projector 15. Thereby, the image displayed on the tabletop 11 is updated.

Next, the third operational example is described.

Figure 19:
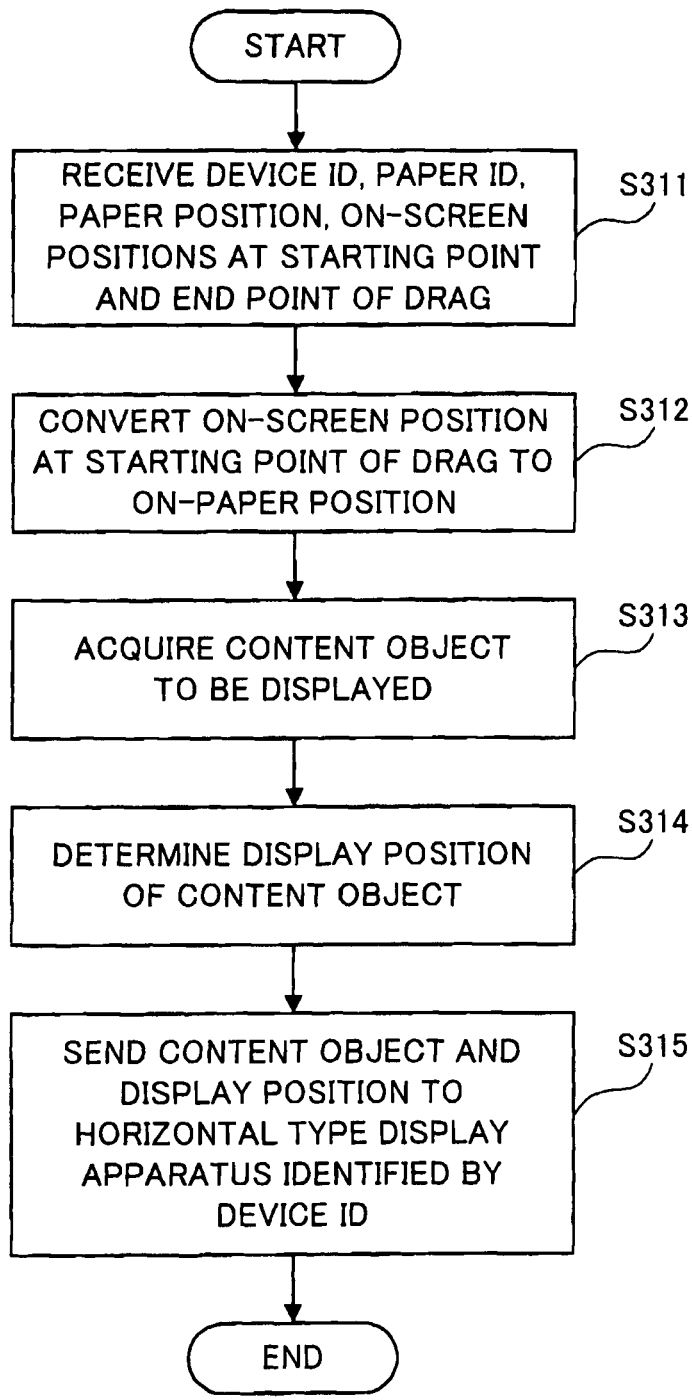
FIG. 19 is a flowchart illustrating an entire process of the third operational example.

FIG. 19 is a flowchart illustrating a flow of the third operational example.

In the third operational example, in the horizontal type display apparatus 10, first the information detecting unit 181 reads a code image 26 printed on the back surface of the paper medium 20 so as to detect the paper ID and the paper position (the position of the paper medium placed on the tabletop 11).

Since the code image 26 printed on the back surface of the paper medium 20 is like the one described with reference to FIG. 15, the description thereof is omitted here.

In the present exemplary embodiment, the paper ID is encoded, and the coded paper ID is set as an identification code in the code image 26. Thereby, the image taken by the infrared camera 18 is analyzed, and the paper ID is obtained so as to realize which paper medium 20 is placed on the horizontal type display apparatus 10.

On the other hand, the paper position is obtained based on the position and the size of the code image within an image taken by the infrared camera 18. For example, within the image taken by the infrared camera 18, if the code image is located on the upper side, it is realized that the image receives infrared light from substantially vertically upper direction. Further, within the image taken by the infrared camera 18, if the code image is located on the lower side, it is realized that the image receives infrared light from horizontally closer direction rather than vertical direction. In addition, a size of the code image 26 is predetermined and is compared with the size of the code image within the image taken by the infrared camera 18, so that the distance from the infrared camera 18 to the code image 26 is recognized. Then, a three-dimensional position of the paper medium 20 is identified based on the direction and the distance obtained here.

When the information detecting unit 181 detects the paper ID and the paper position from the code image 26, the information detecting unit 181 transmits them to the control unit 16.

Further, in the third operational example, in the horizontal type display apparatus 10, the operation detecting unit 112 detects on-screen positions at the starting point and the end point of the drag operation by a user on the tabletop 11 based on signals that are transmitted from the touch panel function provided on the tabletop 11. Here, as shown in FIG. 9, the on-screen position at the starting point of the drag operation is an instruction for the content object desired to be transferred on the paper medium 20 placed thereon. The on-screen position at the end point of the drag operation is an instruction for the destination of the content object.

When the operation detecting unit 112 detects the on-screen positions at the starting point and the end point of the drag operation from the user operation on the tabletop 11, the operation detecting unit 112 transmits them to the control unit 16.

Then, the control unit 16 further transmits the information, namely the paper ID, the paper position and the on-screen positions at the starting point and the end point of the drag to the communication unit 19. The communication unit 19 sends the device ID of its own and the information to the common screen control apparatus 30. Thereby, in the common screen control apparatus 30, the communication unit 39 receives the information (step 311). Then, the received information is transmitted to the control unit 31.

Next, the control unit 31 transmits the paper ID, the paper position and the on-screen position at the starting point of the drag to the content object acquiring unit 33, and instructs to obtain the content object.

Thereby, the content object acquiring unit 33 first converts the on-screen position at the starting point of the drag to the on-paper position (step 312). For example, it is assumed that the paper medium 20 is moved in parallel so as to superimpose an original point of the coordinates on the paper medium 20 on an original point of the coordinates on the tabletop 11. At the time, the coordinates of the starting point of the drag on the tabletop 11 represents the coordinates on the paper medium 20, and therefore the coordinates is obtained as an on-paper position.

Next, the content object acquiring unit 33 identifies the content object to be displayed on the horizontal type display apparatus 10 based on the paper ID received in step 311 and the on-paper position obtained in step 312, and reads the identified content object from the memory not shown in figures (step 313). Then, the read content object is returned to the control unit 31.

In the step 313, specifically, the identification of the content object is based on management information that manages to identify paper, a position on the paper and a content object arranged on the position on the paper.

In the third operational example also, the content object management table as shown in FIG. 18 is referred to as an example of management information. The method for identifying the content object with reference to the content object management table is like the one described in the second operational example. However, unlike the second operational example, the content object including the on-paper position is the content object to be displayed on the horizontal type display apparatus 10 in the third operational example. That is, in the third operational example, as an example of a predetermined condition for identifying the content object, a condition in which the content object is printed on the designated position is adopted.

Next, the control unit 31 transmits the on-screen position at the end point of the drag to the display position determining unit 34, and instructs determination of the display position.

Thereby, the display position determining unit 34 determines the display position of the content object on the tabletop 11 based on the on-screen position at the starting point of the drag (step 314). Then, the determined display position is returned to the control unit 31. At the time, the on-screen position at the starting point of the drag may be set as a display position of the content object as it is, or the position obtained by conversion of the on-screen position at the starting point of the drag in some way may be set as a display position of the content object.

Then, the control unit 31 instructs the communication unit 39 to send the content object that is passed from the content object acquiring unit 33 and the information of the display position that is passed from the display position determining unit 34 to the horizontal type display apparatus 10 that is identified by the device ID held in the control unit 31. Further, the communication unit 39 sends the instructed information to the instructed horizontal type display apparatus 10 (step 315). Thereby, in the horizontal type display apparatus 10, the communication unit 19 receives the content object, and the communication unit 19 passes the content object to the display unit 111 through the control unit 16. Furthermore, the display unit 111 outputs the image of the passed content object to the projector 15, so that the image of the passed content object is reflected to the position in the previous images corresponding to the display position that is passed. Thereby, the image displayed on the tabletop 11 is updated.

Next, the fourth operational example is described.

Figure 20:
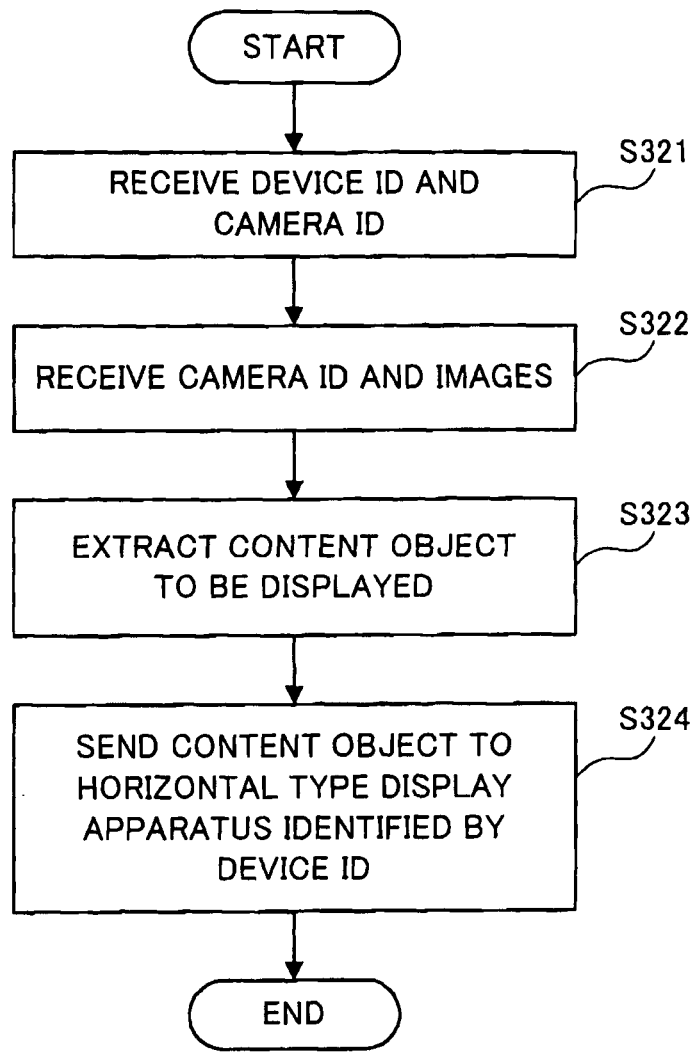
FIG. 20 is a flowchart illustrating an entire process of the fourth operational example.

FIG. 20 is a flowchart illustrating a flow of the fourth operational example.

In the fourth operational example, in the horizontal type display apparatus 10, first the information detecting unit 181 reads a code image 26 adhered on the bottom of the camera 40 so as to detect the camera ID.

Since the code image 26 adhered on the bottom of the camera 40 is like the one described with reference to FIG. 15, the description thereof is omitted here.

In the present exemplary embodiment, the camera ID is encoded, and the coded camera ID is set as an identification code in the code image 26. Thereby, the image taken by the infrared camera 18 is analyzed, and the camera ID is obtained so as to realize which camera 40 is placed over the horizontal type display apparatus 10.

When the information detecting unit 181 detects the camera ID from the code image 26, the information detecting unit 181 transmits the camera ID to the control unit 16. Further, the control unit 16 transmits the camera ID to the communication unit 19, and the communication unit 19 sends the device ID of its own and the camera ID to the common screen control apparatus 30. Thereby, the communication unit 39 receives the information in the common screen control apparatus 30 (step 321). Furthermore, the received information is transmitted to the control unit 31.

In the fourth operational example, the camera 40 holds plural images including an image that stores plural content objects in one sheet. Then, these images are sent to the common screen control apparatus 30 together with the camera ID. Thereby, the communication unit 39 receives the information in the common screen control apparatus 30 (step 322). Further, the received information is transmitted to the control unit 31. With regard to the images held in the camera 40, only the images selected by a user in advance may be sent to the common screen control apparatus 30 instead of sending all the images held in the camera 40 to the common screen control apparatus 30.

At the time, the control unit 31 holds the device ID and the camera ID sent from the horizontal type display apparatus 10 and the camera ID and the images sent from the camera 40. Under the condition, for example, when information on the oscillation of the camera 40 is received from the camera 40, the control unit 31 transmits the images to the content object acquiring unit 33 so as to instruct acquisition of the content object. Alternatively, the information on the oscillation of the camera 40 may be received together with the camera ID and the images in the step 322.

Further, the information of the oscillation of the camera 40 may be received from the horizontal type display apparatus 10. In this case, the oscillation of the camera 40 may be detected based on the access to the detection area of the RFID, analysis of an image obtained by taking an image of the camera 40 or the like as described above.

Alternatively, in the step 322, the camera ID and the image may be received together with information of pressing a shutter button of the camera 40, and thereby the control unit 31 may transmits the images to the content object acquiring unit 33 so as to instruct acquisition of the content object.

Thereby, the content object acquiring unit 33 analyses the images and extracts the content object to be displayed on the horizontal type display apparatus 10 (step 323). Then, the extracted content object is returned to the control unit 31.

As for extracting the content object, the conventional image processing may be used. For example, in the case that a predetermined color background is projected as a background of the content object, an image processing may be performed to eliminate the background of the color. That is, in the fourth operational example, the condition in which the content object is extracted by the image processing is provided as an example of the predetermined condition for identifying the content object.

Then, the control unit 31 instructs the communication unit 39 to send the content object that is passed from the content object acquiring unit 33 to the horizontal type display apparatus 10 that is identified by the device ID held in the control unit 31. Further, the communication unit 39 sends the instructed information to the instructed horizontal type display apparatus 10 (step 324). Thereby, in the horizontal type display apparatus 10, the communication unit 19 receives the content object, and the communication unit 19 passes the content object to the display unit 111 through the control unit 16. Furthermore, the display unit 111 outputs the image of the passed content object to the projector 15, so that the image of the passed content object is reflected to the previous images. Thereby, the image displayed on the tabletop 11 is updated.

Although each content object as a unit is displayed on the horizontal type display apparatus 10 so far, the image held by the medium or the image representing electronic information related to the image may be displayed on the horizontal type display apparatus 10. In this case, the content object acquiring unit 33 is to be provided as an example of a second acquiring unit for acquiring an image held by the medium or electronic information related to the image of the present invention. Further, the control unit 31 is to be provided as an example of a controller for controlling the image or the electronic information to be displayed on the display screen of the present invention.

Finally, a description will be given to a hardware configuration of a computer 90 that is for realizing the present exemplary embodiments.

Figure 21:
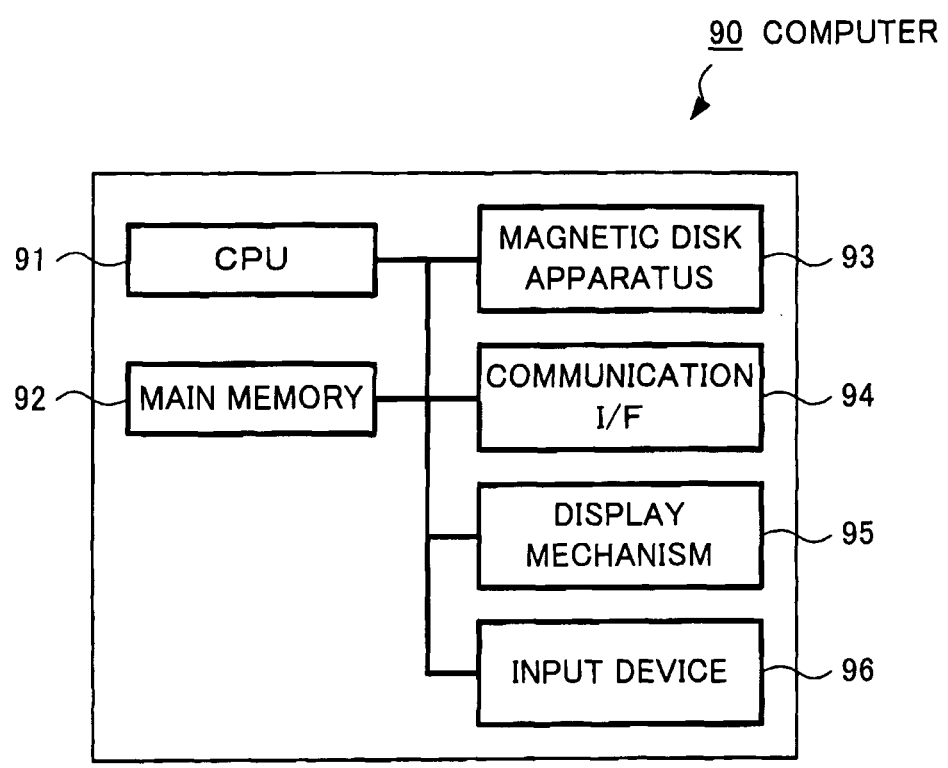
FIG. 21 is a diagram illustrating the hardware configuration of the computer.

FIG. 21 is a diagram illustrating the hardware configuration of the computer 90.

As shown in FIG. 21, the computer 90 is provided with a CPU (Central Processing Unit) 91 that serves as an example of an arithmetic device, and a main memory 92 and a magnetic disk apparatus (HDD: Hard Disk Drive) 93 that are storage devices. Here, the CPU 91 executes OS (operating System) and various kinds of software such as applications and realizes various functions described above. The main memory 92 has a memory area that stores various kinds of software, data used for executing the software and the like. The magnetic disk apparatus 93 stores input data to various kinds of software, output data from various kinds of software and the like.

Further, the computer 90 is provided with a communication I/F 94 that performs communication with external devices, a display mechanism 95 including a video memory, a display and the like, and an input device 96 such as a keyboard, the mouse or the like.

The program that realizes the present exemplary embodiment may be provided not only by a communication device but also by being stored in a memory medium such as a CD-ROM.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A display control apparatus comprising:
a medium identification unit that identifies a medium which is located in touch with a surface of a display apparatus which provides a touch panel;
a detecting unit that detects an operation of a user which is for physically dragging a finger of the user from on a surface of the medium to the surface of the display apparatus;
an image identification unit that identifies, in accordance with a position on which the dragging operation is started, an image element satisfying a predetermined condition among a plurality of image elements included in an image that is held by the medium; and
a controller that controls, based on detection of the dragging operation, the image element identified by the image identification unit to be displayed on a screen of the display apparatus.

2. The display control apparatus according to claim 1, wherein
the display control apparatus further comprises a position identification unit that identifies a position on the surface of the medium, and
the image identification unit identifies the image element which is not printed on the position of the surface of the medium identified by the position identification unit, among the plurality of the image elements included in the image printed on the surface of the medium.

3. The display control apparatus according to claim 1, wherein
the display control apparatus further comprises a position identification unit that identifies a position on the surface of the medium, and
the image identification unit identifies the image element which is printed on the position of the surface of the medium identified by the position identification unit, among the plurality of the image elements included in the image printed on the surface of the medium.

4. The display control apparatus according to claim 3, wherein
the position identification unit further identifies a position on the display screen of the display apparatus, and
the controller controls the image element identified by the image identification unit to be displayed on the position of the display screen of the display apparatus identified by the position identification unit.

5. A display control apparatus comprising:
a first acquiring unit that acquires information indicative of oscillation of a medium over a display screen from an acceleration sensor or from analysis of an image obtained by taking an image of the medium;
a second acquiring unit that acquires an image held by the medium or electronic information on the image; and
a controller that controls the image acquired by the second acquiring unit or an image representing the electronic information acquired by the second acquiring unit to be displayed on the display screen according to the acquisition of information by the first acquiring unit.

6. A display control method comprising:
identifying a medium which is located in touch with a surface of a display apparatus which provides a touch panel;
detecting an operation of a user which is for physically dragging a finger of the user from on a surface of the medium to the surface on the display apparatus;
identifying, in accordance with a position on which the dragging operation is started, an image element satisfying a predetermined condition among a plurality of image elements included in an image that is held by the identified medium; and controlling, based on the detecting of the dragging operation, the identified image element to be displayed on a screen of the display apparatus.

7. A computer readable medium storing a program causing a computer to execute a process for controlling display, the process comprising:

identifying a medium which is located in touch with a surface of a display apparatus which provides a touch panel;

detecting an operation of a user which is for physically dragging a finger of the user from on a surface of the medium to the surface on the display apparatus;

identifying, in accordance with a position on which the dragging operation is started, an image element satisfying a predetermined condition among a plurality of image elements included in an image that is held by the identified medium; and controlling, based on the detecting of the dragging operation, the identified image element to be displayed on a screen of the display apparatus.

8. The computer readable medium according to claim 7, the process further comprising:

identifying a position on the surface of the medium; and identifying the image element satisfying the predetermined condition in which the image element is not printed on the identified position, among the plurality of the image elements included in the image printed on the surface of the medium.

9. The computer readable medium according to claim 7, the process further comprising:

identifying a position on the surface of the medium; and identifying the image element satisfying the predetermined condition in which the image element is printed on the identified position, among the plurality of the image elements included in the image printed on the surface of the medium.

10. The computer readable medium according to claim 9, the process further comprising:

identifying a position on the display apparatus; and controlling the identified image element to be displayed on the position of the identified display apparatus.

11. The computer readable medium according to claim 7, the process further comprising:

acquiring information of oscillation of the medium over the display apparatus from an acceleration sensor or from analysis of an image obtained by taking an image of the medium; and identifying the image element among the plurality of the image elements according to acquisition of the information.

12. The display control apparatus according to claim 1, wherein the display screen of the display apparatus is larger than the medium.

* * * * *